(12) United States Patent
Meiss et al.

(10) Patent No.: US 12,273,052 B2
(45) Date of Patent: *Apr. 8, 2025

(54) APPARATUS AND METHOD FOR CONTACTLESS TRANSPORTATION OF A CARRIER

(71) Applicant: Applied Materials, Inc., Santa Clara, CA (US)

(72) Inventors: Thorsten Meiss, Darmstadt (DE); Alexander Sendobry, Mühltal (DE)

(73) Assignee: Applied Materials, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/500,462

(22) Filed: Nov. 2, 2023

(65) Prior Publication Data

US 2024/0204697 A1    Jun. 20, 2024

Related U.S. Application Data

(63) Continuation of application No. 18/081,493, filed on Dec. 14, 2022.

(51) Int. Cl.
*H01H 47/00* (2006.01)
*H02N 15/00* (2006.01)

(52) U.S. Cl.
CPC .................................. *H02N 15/00* (2013.01)

(58) Field of Classification Search
None
See application file for complete search history.

(56) References Cited

U.S. PATENT DOCUMENTS 5,180,048 A    1/1993   Kawada et al.
5,569,350 A    10/1996  Osada et al.
(Continued)

FOREIGN PATENT DOCUMENTS

CN    101158852 A    4/2008
CN    113707585 A    11/2021
(Continued)

OTHER PUBLICATIONS

International Search Report/ Written Opinion issued to PCT/US2023/079455 on Mar. 6, 2024.
(Continued)

*Primary Examiner* — Stephen W Jackson
(74) *Attorney, Agent, or Firm* — Patterson + Sheridan, LLP

(57) ABSTRACT

An apparatus for contactless transportation of a carrier is provided. The apparatus includes the carrier, being a substrate carrier or a mask carrier. The apparatus includes a linear reluctance motor for providing both a contactless levitation and a contactless drive of the carrier. The linear reluctance motor includes one or more linear stators defining a transportation track for the carrier. The linear reluctance motor includes a mover attached to the carrier. The linear reluctance motor includes a set of electromagnets and a first magnetic material. The one or more linear stators include the set of electromagnets and the mover includes the first magnetic material, or the mover includes the set of electromagnets and the one or more linear stators include the first magnetic material. The apparatus includes a controller connected to the set of electromagnets.

20 Claims, 12 Drawing Sheets

(56) References Cited

U.S. PATENT DOCUMENTS

| | | |
|---|---|---|
| 5,641,054 A | 6/1997 | Mori et al. |
| 6,157,106 A | 12/2000 | Tietz et al. |
| 6,206,176 B1 | 3/2001 | Blonigan et al. |
| 6,231,716 B1 | 5/2001 | White et al. |
| 7,293,850 B2 | 11/2007 | Bonora et al. |
| 7,293,950 B2 | 11/2007 | Bonora et al. |
| 7,438,175 B2 | 10/2008 | White et al. |
| 7,841,820 B2 | 11/2010 | Bonora et al. |
| 7,948,122 B2 | 5/2011 | Compter et al. |
| 7,964,038 B2 | 6/2011 | Patalay et al. |
| 7,994,486 B2 | 8/2011 | Smick et al. |
| 8,104,951 B2 | 1/2012 | Aderhold et al. |
| 8,851,817 B2 * | 10/2014 | Bonora ............ H01L 21/67766 414/217 |
| 9,390,950 B2 | 7/2016 | Sorabji et al. |
| 9,588,443 B2 | 3/2017 | Shibazaki |
| 9,964,863 B1 | 5/2018 | Babayan et al. |
| 10,204,810 B2 | 2/2019 | Hoey et al. |
| 10,236,197 B2 | 3/2019 | Janakiraman et al. |
| 10,256,124 B2 | 4/2019 | Mooring |
| 10,262,887 B2 | 4/2019 | Hao et al. |
| 10,283,397 B2 | 5/2019 | Willwerth et al. |
| 10,460,977 B2 | 10/2019 | Breninger et al. |
| 10,483,141 B2 | 11/2019 | Janakiraman et al. |
| 10,490,436 B2 | 11/2019 | Ghosh et al. |
| 10,734,265 B2 | 8/2020 | Janakiraman et al. |
| 10,770,337 B2 | 9/2020 | Lee et al. |
| 10,784,142 B2 | 9/2020 | Marcelynas et al. |
| 10,851,453 B2 | 12/2020 | Tsai et al. |
| 10,892,180 B2 | 1/2021 | Chia et al. |
| 11,232,965 B2 | 1/2022 | Newman et al. |
| 11,377,310 B2 | 7/2022 | Aust et al. |
| 11,508,595 B2 | 11/2022 | Aust et al. |
| 11,521,870 B2 * | 12/2022 | Kamesh ............ H01L 21/67248 |
| 11,527,424 B2 | 12/2022 | Berger et al. |
| 11,774,864 B2 | 10/2023 | Aoki |
| 2002/0018842 A1 | 2/2002 | Dunlow |
| 2002/0108842 A1 | 8/2002 | Bonora et al. |
| 2003/0178145 A1 | 9/2003 | Anderson et al. |
| 2003/0219977 A1 | 11/2003 | Pomarede et al. |
| 2004/0023495 A1 | 2/2004 | Butterfield et al. |
| 2004/0058293 A1 | 3/2004 | Nguyen et al. |
| 2004/0255442 A1 | 12/2004 | McDiarmid et al. |
| 2006/0102078 A1 | 5/2006 | Fairbairn et al. |
| 2006/0156981 A1 | 7/2006 | Fondurulia et al. |
| 2007/0160507 A1 | 7/2007 | Satoh et al. |
| 2007/0269297 A1 | 11/2007 | Meulen et al. |
| 2008/0175694 A1 | 7/2008 | Park et al. |
| 2008/0232947 A1 | 9/2008 | van der Meulen et al. |
| 2008/0266037 A1 | 10/2008 | Williams |
| 2009/0314211 A1 | 12/2009 | Du Bois et al. |
| 2010/0062592 A1 | 3/2010 | Clark |
| 2010/0136773 A1 | 6/2010 | Akae et al. |
| 2010/0226737 A1 | 9/2010 | Sakaue et al. |
| 2011/0312189 A1 | 12/2011 | Kim et al. |
| 2012/0109355 A1 | 5/2012 | Baccini et al. |
| 2012/0213614 A1 | 8/2012 | Bonora et al. |
| 2012/0249291 A1 | 10/2012 | Holcomb et al. |
| 2013/0171757 A1 | 7/2013 | Ponnekanti et al. |
| 2014/0020629 A1 | 1/2014 | Tsai et al. |
| 2015/0188399 A1 * | 7/2015 | Fukasawa ............ H02K 41/031 310/12.11 |
| 2016/0076910 A1 * | 3/2016 | Ausserlechner ......... G01D 5/12 324/207.11 |
| 2018/0339816 A1 | 11/2018 | Oldendorf et al. |
| 2018/0374732 A1 | 12/2018 | Klein et al. |
| 2019/0348264 A1 | 11/2019 | Tsai et al. |
| 2020/0026060 A1 | 1/2020 | Takato |
| 2020/0232088 A1 | 7/2020 | White et al. |
| 2020/0262060 A1 | 8/2020 | Hosek et al. |
| 2020/0262660 A1 | 8/2020 | Hosek et al. |
| 2020/0381276 A1 | 12/2020 | Yedla et al. |
| 2021/0024929 A1 | 1/2021 | Yokota et al. |
| 2021/0249291 A1 | 8/2021 | Raatz et al. |
| 2021/0265188 A1 | 8/2021 | Moura et al. |
| 2021/0296150 A1 | 9/2021 | Berger et al. |
| 2021/0328146 A1 | 10/2021 | Heymanns et al. |
| 2021/0354934 A1 | 11/2021 | Aust et al. |
| 2022/0003718 A1 | 1/2022 | Watanabe |
| 2022/0013383 A1 | 1/2022 | Savandaiah et al. |
| 2022/0037181 A1 | 2/2022 | Hatano et al. |
| 2022/0130700 A1 | 4/2022 | Newman et al. |
| 2022/0208426 A1 | 6/2022 | Aust et al. |
| 2022/0293451 A1 | 9/2022 | Sulyman et al. |
| 2022/0293452 A1 | 9/2022 | Sulyman et al. |
| 2022/0336258 A1 | 10/2022 | Srivastava et al. |
| 2022/0393618 A1 | 12/2022 | Aust et al. |
| 2022/0415635 A1 | 12/2022 | Yedla et al. |
| 2022/0415687 A1 | 12/2022 | Hatano et al. |
| 2022/0415688 A1 | 12/2022 | Hatano et al. |
| 2023/0132174 A1 | 4/2023 | Thanu et al. |

FOREIGN PATENT DOCUMENTS

| | | |
|---|---|---|
| DE | 102018006259 A1 | 12/2019 |
| EP | 1681261 A1 | 7/2006 |
| EP | 4222779 A1 | 8/2023 |
| JP | 62121134 A | 6/1987 |
| JP | H06324297 A | 11/1994 |
| KR | 10-20210081597 A | 7/2021 |
| KR | 1020220099611 A | 7/2022 |
| TW | 202141675 A | 11/2021 |
| WO | 2008077048 A2 | 6/2008 |
| WO | 2011102410 A1 | 8/2011 |
| WO | 2015007385 A1 | 1/2015 |
| WO | 2015043712 A1 | 4/2015 |
| WO | 2015140155 A1 | 9/2015 |
| WO | 2015158725 A1 | 10/2015 |
| WO | 2015162177 A1 | 10/2015 |
| WO | 2015189263 A1 | 12/2015 |
| WO | 2016162288 A1 | 10/2016 |
| WO | 2019037858 A1 | 2/2019 |
| WO | 2019052657 A1 | 3/2019 |
| WO | 2019145035 A1 | 8/2019 |
| WO | 2019238416 A1 | 12/2019 |
| WO | 2020126040 A1 | 6/2020 |
| WO | 2020192911 A1 | 10/2020 |
| WO | 2021106796 A1 | 6/2021 |
| WO | 2021106799 A1 | 6/2021 |
| WO | 2021223843 A1 | 11/2021 |
| WO | 2022044834 A1 | 3/2022 |

OTHER PUBLICATIONS

U.S. Appl. No. 18/081,493, filed Dec. 14, 2022.
U.S. Appl. No. 18/141,909, filed May 1, 2023.
U.S. Appl. No. 18/141,914, filed May 1, 2023.
U.S. Appl. No. 18/141,920, filed May 1, 2023.
U.S. Appl. No. 18/141,923, filed May 1, 2023.
U.S. Appl. No. 18/141,926, filed May 1, 2023.
U.S. Appl. No. 18/141,931, filed May 1, 2023.
International Search Report and Written Opinion in related application PCT/US2023/035709 dated Feb. 5, 2024.
Yu et al.; Controller design and implementation of six-degree-of-freedom magnetically levitated positioning system with high precision; Proc. IMechE vol. 222 Part I: J. Systems and Control Engineering; 12 pages.
Zhu et al; Design and Control of a Six Degrees-of-Freedom Magnetically Levitated Positioning System; IFAC PapersOnLine 49-21 (2016) pp. 127-132.
Temposonics; Sensor Selector Guide; Retrieved from the Internet at: <https://www.temposonics.com/docs/temposonicslibraries/literature/sensor_selector_guide_industrial_551814_en.pdf?sfvrsn=5fde8874_12>; 21 pages.
Linear Motion Tips; How do Magnettostrictive sensors work?; Retrieved from the Internet at: <https://www.linearmotiontips.com/how-do-magnetostrictive-sensors-work/> 9 Pages.

* cited by examiner

APPARATUS AND METHOD FOR CONTACTLESS TRANSPORTATION OF A CARRIER

CROSS REFERENCE TO RELATED APPLICATION(S)

This application is a continuation of U.S. patent application Ser. No. 18/081,493, filed Dec. 14, 2022, which is herein incorporated by reference in its entirety.

FIELD

The present disclosure relates to apparatuses and methods for contactlessly transporting a substrate or mask carrier. The substrate or mask carrier carries a substrate, such as glass substrates or semiconductor wafers, or a mask for masking a substrate in a deposition process, e.g. an evaporation process or sputtering process. The substrate or mask carrier is contactlessly levitated by a magnetic levitation force acting on the carrier. The substrate or mask carrier is contactlessly transported in a vacuum chamber.

BACKGROUND

Techniques for layer deposition on a substrate include, for example, sputter deposition, physical vapor deposition (PVD), chemical vapor deposition (CVD) and thermal evaporation. Coated substrates can be used in several applications and in several technical fields. For instance, coated substrates may be used in the field of display devices. Display devices can be used for the manufacture of television screens, computer monitors, mobile phones, other hand-held devices, and the like for displaying information. Typically, displays are produced by coating a substrate with a stack of layers of different materials. The same is true for semiconductor wafer processing.

In order to deposit a layer stack, an in-line arrangement of processing modules can be used. An in-line processing system includes a plurality of processing modules, such as deposition modules and optionally further processing modules, e.g., cleaning modules and/or etching modules, wherein processing aspects are subsequently conducted in the processing modules such that a plurality of substrates can continuously or quasi-continuously be processed in the in-line processing system.

The substrate may be carried by a carrier, i.e. a carrying device for carrying the substrate in the vacuum system. The carrier carrying the substrate is typically transported through the vacuum system using a transport system. The transport system may be a magnetic levitation system, such that the carrier can be transported contactlessly or essentially contactlessly. The transport system may be configured for conveying the carrier having the substrate positioned thereon along one or more transport paths in the vacuum system, e.g. from one processing device to another processing device.

An accurate and smooth transportation of the carriers through the vacuum system is challenging. For instance, particle generation due to wear of moving parts can cause a deterioration in the manufacturing process. Accordingly, there is a demand for transportation of carriers in processing systems with reduced or minimized particle generation. Further, the task of configuring, operating and maintaining a transportation system based on magnetic levitation can be involved and time-consuming. Further, the cost of magnetic levitation systems can be high.

Accordingly, providing improved apparatuses and methods for transporting carriers, which overcome at least some of the problems mentioned above, would be beneficial.

SUMMARY

According to an embodiment, an apparatus for contactless transportation of a carrier is provided. The apparatus includes the carrier, being a substrate carrier or a mask carrier. The apparatus includes a linear reluctance motor for providing both a contactless levitation and a contactless drive of the carrier. The linear reluctance motor includes one or more linear stators defining a transportation track for the carrier. The linear reluctance motor includes a mover connected to the carrier. The linear reluctance motor includes a set of electromagnets and a first magnetic material. The one or more linear stators include the set of electromagnets and the mover includes the first magnetic material, or the mover includes the set of electromagnets and the one or more linear stators include the first magnetic material. The apparatus includes a controller connected to the set of electromagnets.

According to a further embodiment, a processing system for processing a substrate is provided. The processing system includes an apparatus for contactless transportation of a carrier as described herein, the carrier being a substrate carrier. The processing system includes a processing device, such as a deposition source or an inspection device. The linear reluctance motor may be configured to contactlessly transport the carrier to a processing position. In the processing position, the carrier may be arranged for processing of a substrate supported by the carrier using the processing device.

According to a further embodiment, a method for contactless transportation of a carrier is provided. The method includes controlling at least one electromagnet of a set of electromagnets of a linear reluctance motor. The linear reluctance motor includes one or more linear stators defining a transportation track for the carrier, the carrier being a substrate carrier or a mask carrier. The linear reluctance motor includes a mover connected to the carrier. The linear reluctance motor includes the set of electromagnets and a first magnetic material. The one or more linear stators include the set of electromagnets and the mover includes the first magnetic material, or the mover includes the set of electromagnets and the one or more linear stators include the first magnetic material. The at least one electromagnet is controlled to generate a magnetic field interacting with the first magnetic material to provide both a reluctance-based vertical force and a reluctance-based drive force acting on the mover.

Embodiments are also directed at apparatuses for carrying out the disclosed methods and include apparatus parts for performing each described method aspect. The method aspects may be performed by way of hardware components, a computer programmed by appropriate software, by any combination of the two or in any other manner. Furthermore, embodiments according to the disclosure are also directed at methods for operating the described apparatus and a method for manufacturing the apparatuses and devices described herein. The methods for operating the described apparatus include method aspects for carrying out every function of the apparatus.

BRIEF DESCRIPTION OF THE DRAWINGS

So that the manner in which the above recited features of the present disclosure can be understood in detail, a more particular description of the disclosure, briefly summarized above, may be had by reference to embodiments. The accompanying drawings relate to embodiments of the disclosure and are described in the following.

DETAILED DESCRIPTION

Figure 1:
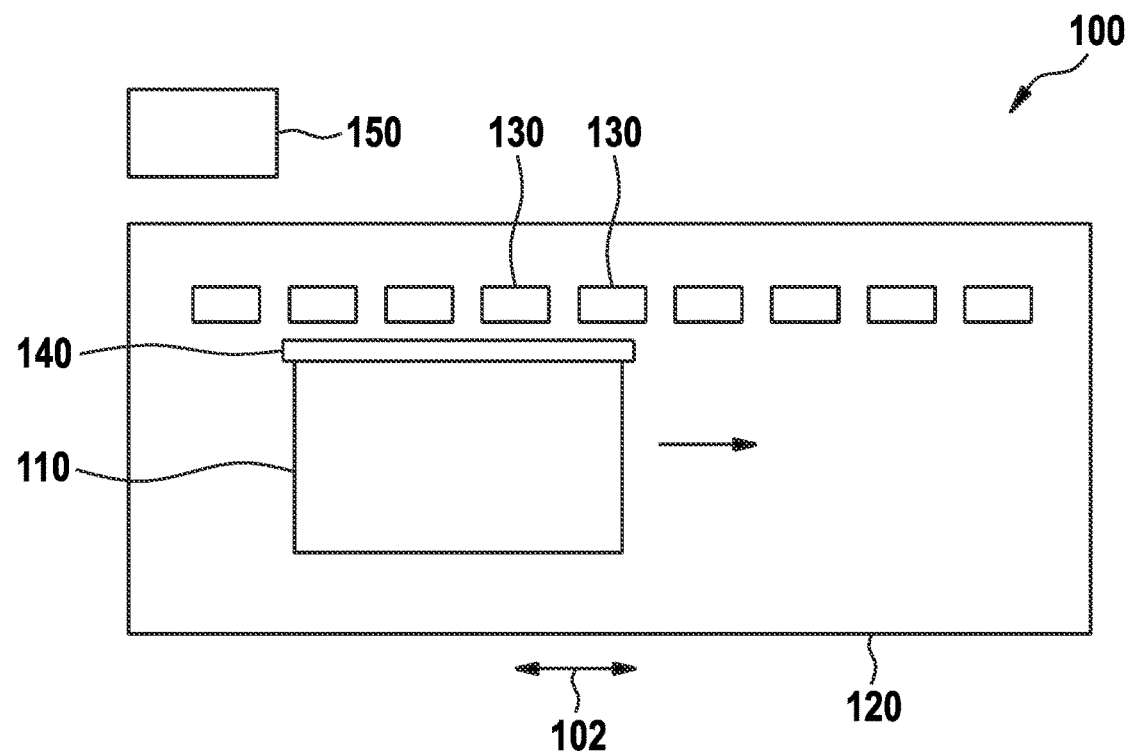
FIG. 1 shows an apparatus for contactless transportation of a carrier according to embodiments described herein.

Reference will now be made in detail to the various exemplary embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. The intention is that the present disclosure includes such modifications and variations.

Within the following description of the drawings, the same reference numbers refer to same components. Only the differences with respect to the individual embodiments are described. The structures shown in the drawings are not necessarily depicted true to scale but rather serve the better understanding of the embodiments.

A horizontal direction, orientation, axis, force and the like, as described herein, may include a deviation from exact horizontality by 5 degrees, 10 degrees or even up to 15 degrees. A vertical direction, orientation, axis, force and the like, as described herein, may include a deviation from exact verticality by 5 degrees, 10 degrees or even up to 15 degrees. The notion of substantially parallel directions, axes, forces, and the like allows for deviations of 5 degrees, 10 degrees or even up to 15 degrees with respect to an exactly parallel configuration.

A carrier as described herein can be a substrate carrier. A substrate can be a thin, flat piece of material. In the present disclosure, the term "substrate" may particularly embrace substantially inflexible substrates, e.g., a wafer (such as a semiconductor wafer), slices of transparent crystal such as sapphire or the like, or a glass plate. The present disclosure is not limited thereto, and the term "substrate" may also embrace flexible substrates such as a web or a foil. According to embodiments described herein, the substrate may be made of any material suitable for material deposition. For instance, the substrate may be made of a material selected from the group consisting of glass (for instance soda-lime glass, borosilicate glass etc.), metal, polymer, ceramic, compound materials, carbon fiber materials, a semiconductor material (for instance silicon, silicon-carbide or gallium arsenide) or any other material or combination of materials which can be coated by a deposition process.

A substrate can be a large area substrate, such as a large area substrate for display manufacturing. The term "large area substrate" refers to a substrate having a main surface with an area of 0.5 $m^2$ or larger, particularly of 1 $m^2$ or larger. In some embodiments, a large area substrate can be GEN 4.5, which corresponds to about 0.67 $m^2$ of substrate (0.73 m×0.92 m), GEN 5, which corresponds to about 1.4 $m^2$ of substrate (1.1 m×1.3 m), GEN 7.5, which corresponds to about 4.29 $m^2$ of substrate (1.95 m×2.2 m), GEN 8.5, which corresponds to about 5.7 $m^2$ of substrate (2.2 m×2.5 m), or even GEN 10, which corresponds to about 8.7 $m^2$ of substrate (2.85 m×3.05 m). Even larger generations such as GEN 11 and GEN 12 and corresponding substrate areas can similarly be implemented. Further, the substrate thickness can be from 0.1 mm to 1.8 mm, particularly about 0.9 mm or below, such as 0.7 mm or 0.5 mm. Alternatively, a substrate can be a wafer, such as a semiconductor wafer. A wafer can have a dimension (e.g. diameter) of, for example, 450 mm or less, particularly 300 mm or less, or even 25 mm or less.

A substrate carrier as described herein may be a vertically oriented substrate carrier, e.g. for supporting a large area substrate, or a horizontally oriented substrate carrier, e.g. for supporting a wafer.

A carrier as described herein can be a mask carrier. A mask may be used in a deposition process, e.g. a sputtering process or evaporation process. A mask is configured for preventing one or more portions of a substrate from receiving deposition material. The one or more portions may be shielded or covered by the mask. For example, a mask can be an edge exclusion mask for preventing a deposition of material on one or more edge regions of a substrate. Alternatively, a mask can carry the deposition material. The deposition material can be deposited onto the substrate by bringing the mask and the substrate into contact with each other, so that the deposition material is transferred from the mask onto the substrate. A mask carrier may be a vertically oriented mask carrier or a horizontally oriented mask carrier.

In the present disclosure, the term "contactless" can be understood in the sense that a weight, e.g. the weight of a carrier, particularly the weight of a carrier carrying a substrate or a mask, is not held by a mechanical contact or mechanical forces, but is held by a magnetic force. In other words, the term "contactless" can be understood in that a carrier is held in a levitating or floating state using magnetic forces instead of mechanical forces, i.e. contact forces.

According to an embodiment, an apparatus for contactless transportation of a carrier is provided. The apparatus includes the carrier, being a substrate carrier or a mask carrier. The apparatus includes a linear reluctance motor for providing both a contactless levitation and a contactless drive of the carrier. The linear reluctance motor includes one or more linear stators defining a transportation track for the carrier. The linear reluctance motor includes a mover connected to the carrier. The linear reluctance motor includes a set of electromagnets and a first magnetic material. The one or more linear stators include the set of electromagnets and the mover includes the first magnetic material, or the mover includes the set of electromagnets and the one or more linear stators include the first magnetic material. The apparatus includes a controller connected to the set of electromagnets.

Embodiments described herein provide for both a contactless levitation and a contactless drive of a substrate carrier or mask carrier using a single system, namely the linear reluctance motor. The present disclosure thereby differs from known apparatuses where the contactless levitation of the carrier is provided by a magnetic levitation system and the contactless drive of the carrier is provided by a magnetic drive system that is separated from and operates independently of the magnetic levitation system. With respect to such known apparatuses, the present disclosure provides several advantages. For example, a double cost for acquiring and maintaining two separate systems is avoided. Further, the tasks of configuring, operating and maintaining the linear reluctance motor, i.e. a single system, is much simpler as compared to performing such tasks for a magnetic levitation system and a magnetic drive system as two separate systems. Further, a carrier that interacts with a single system such as the linear reluctance motor has a simplified design as compared to a carrier that interacts with a magnetic levitation system and a magnetic drive system separately. Further, the linear reluctance motor takes up less space as compared to two separate systems for levitation and drive, leading to a more compact apparatus. Further, in some embodiments, the linear reluctance motor can operate without making use of permanent magnets. Accordingly, no rare earth materials are needed, and problems arising from usage of such materials (such as trade restrictions, transportation issues) are avoided. Several further advantages are provided by embodiments described herein, such as a higher uptime and reliability, a reduced number of mounting points, a reduced number of control units (no competing controllers), and an increased robustness.

Figure 2:
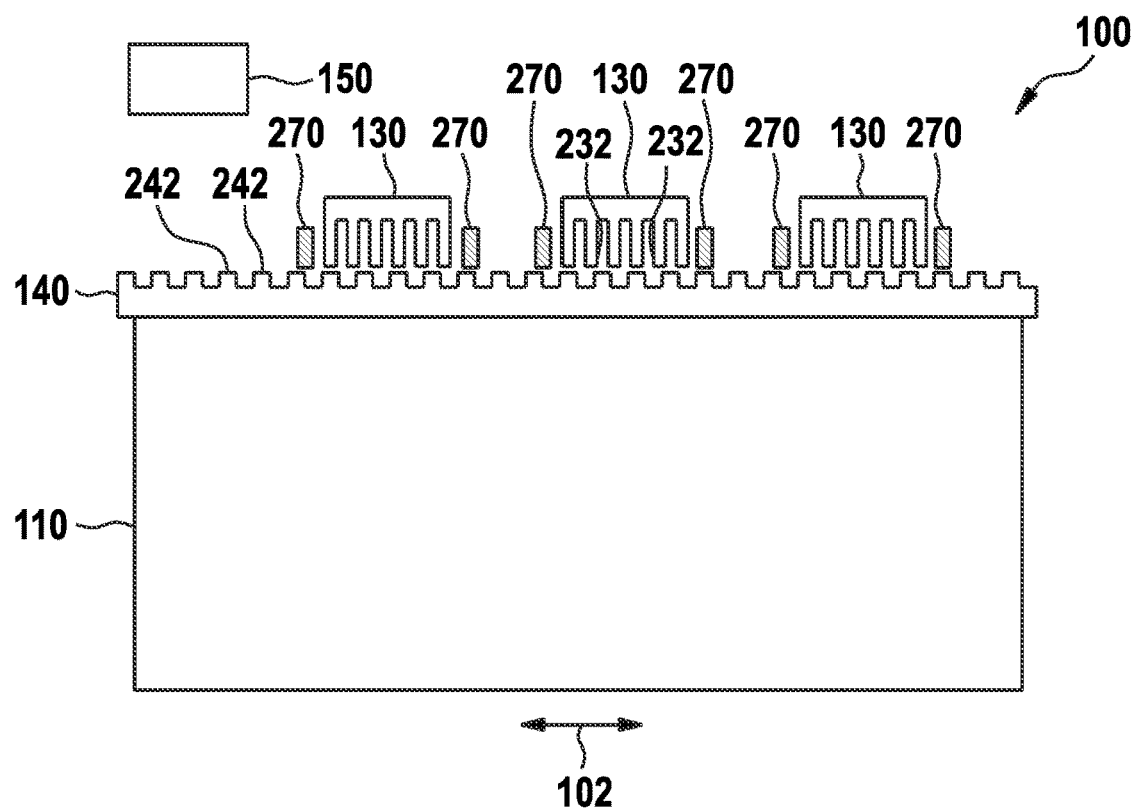
FIG. 2 shows an apparatus for contactless transportation of a carrier according to embodiments described herein.

FIGS. 1-2 show a side view of an apparatus 100 for contactless transportation of a carrier 110 according to embodiments described herein. The apparatus 100 may include a vacuum chamber 120. The apparatus 100 may be configured for contactless transportation of the carrier 110 in the vacuum chamber 120.

The carrier 110 may be a substrate carrier or a mask carrier. As shown in FIG. 1, the carrier 110 may be held and transported in a vertical orientation of the carrier. In other embodiments, the carrier 110 may have a horizontal orientation.

The apparatus 100 may be configured for contactlessy transporting the carrier 110. The apparatus 100 may have a transportation track along which the carrier 110 is contact-lessly transported. The transportation track may be a horizontal track. The transportation track may be a substantially straight transportation track, or may at least include one or more straight portions along which the carrier 110 may be contactlessly transported. The transportation track may define a transportation direction 102 (or transport direction), along which the carrier 110 is contactlessly transported. The transportation direction may be a horizontal direction.

The apparatus 100 includes one or more linear stators 130, such as a plurality of linear stators. For example, the apparatus may include 2 or more, 3 or more, 5 or more, or 10 or more linear stators, depending on the desired length of the transportation track. Alternatively, the apparatus 100 may include one elongated linear stator 130 extending along the entire transportation track. The number of linear stators shown in the figures is illustrative and the disclosure shall not be limited thereto.

The spatial arrangement of the one or more linear stators 130 may define the transportation track for the carrier 110. For example, a plurality of linear stators may be disposed one after the other to define the transportation track extending in the transportation direction 102. The one or more linear stators 130 are configured to remain stationary during contactless transportation of the carrier 110 along the transportation track.

As shown for example in FIG. 2, a linear stator 130 may include a plurality of stator poles 232, such as 2, 4, 6, 8 or more stator poles. The number of stator poles shown in the figures is illustrative and the disclosure shall not be limited thereto. The stator poles may be protrusions, or teeth, that may project towards the carrier 110 and/or towards a mover 140 attached to the carrier. The plurality of stator poles 232 may define at least one comb structure. In some embodiments, a linear stator may include two comb structures, each having a plurality of stator poles.

A linear stator as described herein, and specifically the stator poles of a linear stator, may include, or be made of, a magnetic material, more specifically a ferromagnetic material. The magnetic material may be a non-permanent, or soft, magnetic material. The magnetic material may be a metal, such as electrical steel, silicon steel, ferritic steel, martensitic steel, or any other soft magnetic material.

The apparatus 100 includes a mover 140. The mover 140, particularly the mover poles of the mover, may include, or be made of, a magnetic material, such as a ferromagnetic material. The magnetic material may be a non-permanent, or soft, magnetic material. The magnetic material may be a metal, such as electrical steel, silicon steel, ferritic steel, martensitic steel, or any other soft magnetic material.

The mover 140 is attached to the carrier 110. The mover 140 may be or include an elongated bar of non-permanent magnetic material disposed at a top portion of the carrier, for example along substantially the entire width of the carrier.

In some embodiments, as shown for example in FIG. 1, the carrier 110 can be contactlessly transported in a vertical orientation of the carrier 110, for example if the carrier is a substrate carrier for a large area substrate or a mask carrier carrying a mask for a large area substrate. The mover 140 may be attached at a top portion of the vertically oriented carrier. The one or more linear stators 130, or at least a portion thereof, may be disposed above the vertically oriented carrier. In other embodiments, the carrier 110 can be contactlessly transported in a horizontal orientation of the carrier, as discussed in more detail below.

The carrier 110 is configured to be contactlessly transported along the transportation track together with the mover 140, while the one or more linear stators 130 remain stationary. During contactless levitation and/or transportation of the carrier 110, the mover 140 faces at least one linear stator 130. The mover 140 may respectively face different linear stators 130 as the carrier 110 is transported along the transportation track.

As shown in FIG. 2, the mover may include a plurality of mover poles 242, such as 10, 20, 40 or more mover poles. The mover poles may be protrusions, or teeth, that may project towards at least one linear stator. The plurality of mover poles 242 may define a comb structure.

A pitch, or spacing, may be provided between adjacent stator poles 232 of a linear stator 130. The term "adjacent stator poles" (and likewise "adjacent mover poles") refers to poles of a same linear stator 130 that are adjacent to each other with respect to the direction defined by the transportation track, such as the transportation direction 102. The pitch may be a distance, e.g. a horizontal distance, extending along the transportation track. Likewise, a pitch or spacing may be provided between adjacent mover poles 242 of the mover 140. According to embodiments, a first pitch between adjacent stator poles of a linear stator 130 may be different from a second pitch between adjacent mover poles of the mover 140. Particularly, a ratio of the first pitch and the second pitch may be non-integer (the first pitch is not an integer multiple of the second pitch and the second pitch is not an integer multiple of the first pitch). The stator poles of a linear stator 130 and the mover poles of the mover 140 may be provided according to a p/q configuration. A p/q configuration means that the distance (in the transportation direction) spanned by p consecutive adjacent stator poles of the linear stator 130 includes a total of q mover poles of the mover 140. In some embodiments, q may be equal to p+1 or to p−1. For example, it may be the case that p=3 and q=2; or p=3 and q=4. In further examples, it may be the case that p=4 and q=3.

According to some embodiments, the one or more linear stators 130 include a set of electromagnets. In light thereof, the one or more linear stators 130 are active magnetic systems that can provide an adjustable, controllable magnetic field. For example, each stator pole of a linear stator may carry an electromagnet. The electromagnet may include a respective coil wound around each stator pole. In such embodiments, the mover 140 may not include an electromagnet. The mover 140 may be a magnetically passive system, wherein the mover poles are formed from a non-permanent magnetic material, without any electromagnets mounted thereon.

Alternatively, according to other embodiments, the set of electromagnets may be part of the mover 140. In light thereof, the mover 140 is an active magnetic system. For example, each mover pole of the mover may carry an electromagnet. The electromagnet may include a respective coil wound around each mover pole. In such embodiments, the one or more linear stators may not include any electromagnets. The one or more linear stators are magnetically passive.

For the sake of concreteness, in the following the apparatus 100 will be described with reference to a configuration where the one or more linear stators 130 are active magnetic systems and the mover 140 is a passive system, i.e. the electromagnets are part of the one or more stators. The disclosure is not limited thereto and the aspects described herein also apply to a configuration where the mover is an active system and the one or more linear stators are passive.

An AC current may be provided in any electromagnet of the set of electromagnets of the linear reluctance motor. Alternatively or additionally, a DC current may be provided in any electromagnet. The current (AC and/or DC) carried by an electromagnet may be configured for providing a magnetic field.

The apparatus 100 may include a controller 150. The controller 150 is connected to the set of electromagnets for controlling a current in the electromagnets.

A controller as described herein may be a single centralized controller or may be a distributed controller including a plurality of individual control units. A controller may include a central processing unit (CPU), a memory and, for example, support circuits. To facilitate control of the apparatus, the CPU may be one of any form of general-purpose computer processor that can be used in an industrial setting for controlling various components and sub-processors. The memory may be coupled to the CPU. The memory, or a computer readable medium, may be one or more readily available memory devices such as random-access memory, read only memory, a floppy disk, a hard disk, or any other form of digital storage either local or remote. The support circuits may be coupled to the CPU for supporting the processor in a conventional manner. The circuits in question include cache, power supplies, clock circuits, input/output circuitry and related subsystems, and the like.

The one or more linear stators 130 including the electromagnets may, together with the mover 140, provide a linear reluctance motor for providing both a contactless levitation and a contactless drive of the carrier 110.

A linear reluctance motor as described herein is a linear motor. A linear motor is configured for providing a linear motion, or translational motion, of the carrier. A linear motor is distinguished from a rotary motor, which provides a rotational motion. The linear reluctance motor of the apparatus according to embodiments described herein provides a linear motion of the carrier along the transportation track.

A linear reluctance motor as described herein is a reluctance motor, or reluctance machine. In a reluctance motor, the movement of the mover results from the fact that the system formed by stator(s) and mover strives to reach a state where the magnetic reluctance, or magnetic resistance, is minimal, or at least reduced. In the linear reluctance motor as described herein, the magnetic forces acting on the mover to provide a levitation and a drive of the carrier may result from an interaction between a magnetic field generated by one or more electromagnets mounted on the stator poles and the non-permanent magnetic material forming the mover poles. A reluctance motor is distinguished from other types of electric motors, such as induction motors (e.g. asynchronous induction motors or synchronous motors based on a Lorentz force).

As described herein, the linear reluctance motor includes a first magnetic material, which may be part of the one or more linear stators or of the mover. The first magnetic material may be understood as a portion of the linear reluctance motor that interacts with the magnetic field generated by the set of electromagnets to provide the reluctance-based vertical force and the reluctance-based drive force acting on the carrier as described herein. In embodiments where the set of electromagnets of the linear reluctance motor are part of the one or more linear stators, the first magnetic material of the linear reluctance motor can be understood as the magnetic material forming the mover poles of the mover, as described herein. In embodiments where the set of electromagnets of the linear reluctance motor are part of the mover, the first magnetic material of the linear reluctance motor may be understood as the magnetic material forming the stator poles of the one or more stators, as described herein.

The first magnetic material of the linear reluctance motor may be a ferromagnetic material. The first magnetic material may be a non-permanent, or soft, magnetic material. The magnetic material may be a metal, for example electrical steel, silicon steel, ferritic steel, martensitic steel, or any other soft magnetic material.

Figure 3:
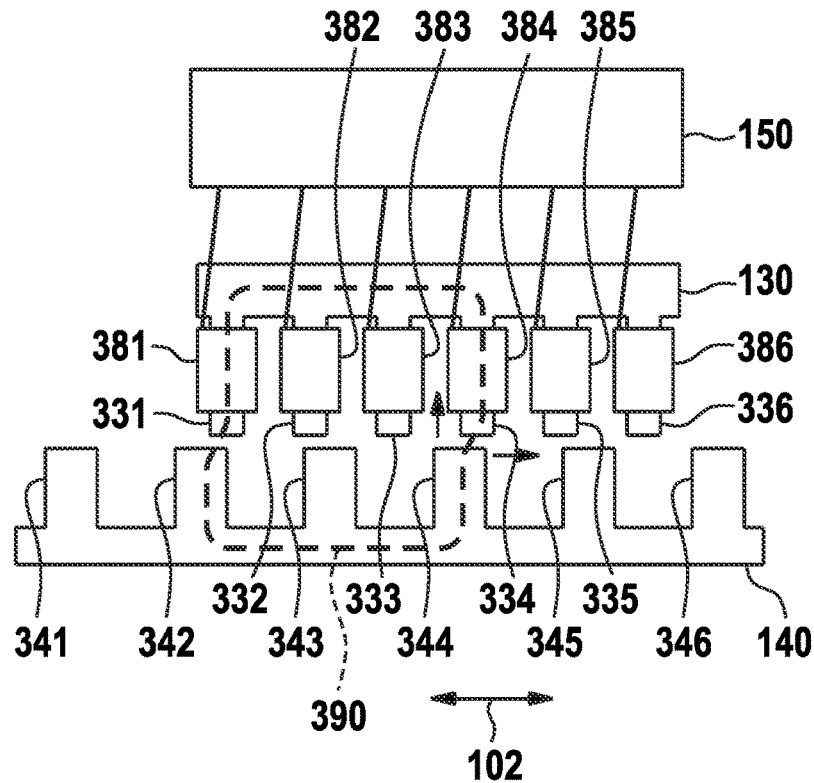
FIGS. 3-4 illustrate the operation of a linear reluctance motor of an apparatus for contactless transportation of a carrier according to embodiments described herein.

The operation principles of the linear reluctance motor are illustrated in FIG. 3, which shows a linear stator 130 and a portion of the mover 140 in a side view. For ease of presentation, the carrier 110 is not shown. Additional linear stators may be provided, as shown for example in FIGS. 1 and 2, and the discussion below also applies to such additional linear stators.

For the sake of concreteness, but without limitation, the linear stator 130 shown in FIG. 3 has six consecutive stator poles numbered from 331 through 336. Each stator pole has an electromagnet mounted thereto, the six respective electromagnets being numbered from 381 through 386. The electromagnets 381 through 386 are controlled by the controller 150.

FIG. 3 further shows a portion of the mover 140. The mover 140 includes a plurality of mover poles, some of which are shown in FIG. 3 and labelled by 341 through 346. The pitch between adjacent mover poles is different from, and, in the illustrative example, larger than the pitch between adjacent stator poles of the linear stator 130.

In the example illustrated in FIG. 3, two of the electromagnets, namely 381 and 384, are excited to generate a magnetic field 390, or magnetic flux, according to a closed loop as schematically shown in FIG. 3. The electromagnets 381 and 384 may be controlled by the controller 150 to generate the magnetic field 390. The magnetic field 390 may extend through the two respective stator poles 331 and 334 on which the two electromagnets 381 and 384 are mounted. The magnetic field 390 may further extend through the mover pole 342 which is closest to stator pole 331 and through mover pole 344 which is closest to stator pole 334.

As described herein, the mover poles may include, or may be made of, a non-permanent magnetic material such as a ferromagnetic material. The magnetic field 390 interacts with the non-permanent magnetic material, so that a magnetic force is exerted on the mover 140. The magnetic force causes the mover 140—and also the carrier 110 which is attached to the mover 140—to move towards a position of minimum magnetic reluctance, or minimum magnetic resistance. In other words, a contactless force is exerted on the mover 140 in order to minimize, or at least reduce, the magnetic reluctance, or magnetic resistance, of the system. The force in question is an attractive force. Since the magnetic reluctance is lower when the vertical distance between the mover 140 and the linear stator 130 is decreased, an upward force, that is to say, a magnetic levitation force, is exerted on the mover 140. In addition, in order to reduce the magnetic reluctance, the system also strives towards a position where the horizontal distance between, for example, the stator pole 334 and the mover pole 344, is reduced as much as possible. Accordingly, the system aims to reach a configuration where the stator pole 334 is aligned with the mover pole 344. In the present context, alignment of two poles (one stator pole and one mover pole) can be understood in the sense that the two poles face each other so that there is no horizontal offset between the two poles. In the example shown in FIG. 3, mover pole 344, which is near to stator pole 334, will strive to align with the stator pole 334. Accordingly, a contactless force urging the mover 140 to move horizontally along the transportation track, i.e. a drive force, is provided in addition to the magnetic levitation force.

In light of the above, the linear reluctance motor provides two forces acting on the carrier, namely a vertical force which, in the present example, is a levitation force that contactlessly levitates the carrier, and a drive force which transports the carrier along the transportation track. Both forces are reluctance-based forces.

According to embodiments described herein, the controller may be configured to control at least one electromagnet of the set of electromagnets, or at least two electromagnets, to generate a magnetic field interacting with the first magnetic material of the linear reluctance motor to provide both a reluctance-based vertical force and a reluctance-based drive force acting on the mover.

A reluctance-based force is a force generated by the linear reluctance motor. A reluctance-based force is a force resulting from an interaction between a magnetic field generated by at least one electromagnet of the linear reluctance motor and the non-permanent first magnetic material forming, e.g., the mover poles. A reluctance-based force can be understood as a magnetic force acting on the carrier caused by the fact that the system comprised by the one or more linear stators and the mover of the linear reluctance motor strives towards a state of minimal, or at least reduced, magnetic reluctance, as described herein. A reluctance-based force is an attractive force.

The reluctance-based vertical force acting on the mover extends in a vertical direction. The reluctance-based vertical force may be a magnetic levitation force, i.e. an upward force that lifts the carrier, for example in the case where the one or more linear stators are disposed above the carrier, as shown in FIG. 3. In other examples, the reluctance-based vertical force may be a downward force, such as in an apparatus where the one or more linear stators are disposed below the carrier, as shown for example in FIG. 14. In such a case, the reluctance-based vertical force may pull the carrier downward. One or more permanent magnets providing a levitation of the carrier may be included in the linear reluctance motor, and the downward reluctance-based vertical force may compensate said levitation in a controllable manner. The vertical position of the carrier can be controlled by controlling the downward reluctance-based vertical force.

The reluctance-based drive force may extend in a horizontal direction. The reluctance-based drive force may extend in the transportation direction.

Both the reluctance-based vertical force and the reluctance-based drive force are controllable forces. The forces in question can be controlled by controlling one or more, particularly two or more, electromagnets.

Returning to FIG. 3, after the mover 140 has reached a position of maximal alignment between, for example, the stator pole 334 and the mover pole 344, further pairs of electromagnets of the linear stator 130 can be activated in a similar manner, so that the transportation movement of the mover 140 along the linear stator 130 can be continued. For example, under the control of the controller 150, first the electromagnets 381 and 384 can be activated, followed by electromagnets 383 and 386, in turn followed by electromagnets 382 and 385. That is to say, under the control of the controller, different electromagnets may be switched on and off. In each case, a reluctance-based drive force is exerted on the mover 140 to bring at least one respective mover pole in alignment, or near-alignment, with at least one corresponding stator pole, so as to reduce or minimize the magnetic reluctance. At the same time, a reluctance-based vertical force levitation force contactlessly levitates the mover 140, also to reduce or minimize the magnetic reluctance.

Since the ratio of the pitch between adjacent stator poles and the pitch between adjacent mover poles is non-integer, the mover 140 will not get stuck in a stable equilibrium position where all mover poles align with all stator poles. The contactless transportation movement of the mover 140 can be continued by providing further linear stators 130 one after the other, defining the transportation track. A contactless drive force transporting the mover 140 and carrier 110 over an arbitrary distance along the transportation track can be provided.

A current that is carried by an electromagnet can be understood as an electric current that is guided through a coil of the electromagnet for generating a magnetic field. An electromagnet as described herein may carry a total current. The total current may be supplied to the electromagnet by one or more power supplies of the apparatus 100. The total current may be a superposition, or sum, of a first current and a second current. The first current and the second current may be controlled individually by the controller. The first current may be a constant current, or DC current. For example, the first current may have a magnitude from −30 A to +30 A, particularly −20 A to +20 A, such as for example about +/−10 A. The second current may be an AC current, e.g. an AC current having a sinusoidal behavior or other time-dependent behavior. The second current may have a magnitude from −30 A to +30 A, particularly −20 A to +20 A, such as for example about +/−10 A. Which particular magnitude of the first/second current is suitable may depend on which controller and/or amplifier is used. By controlling the first current (e.g. using the controller 150), the magnitude of the reluctance-based vertical force acting on the mover 140, and accordingly the vertical position of the carrier 110, can be controlled. The first current may be referred to as levitation control current. By controlling the second current (e.g. using the controller 150), the magnitude of the reluctance-based drive force acting on the mover 140, and accordingly the horizontal position of the carrier 110 with respect to the transport direction, can be controlled. The second current may be referred to as drive control current.

In order to provide a magnetic field 390 as shown in FIG. 3, the two electromagnets 381 and 384 mounted to the stator poles 331 and 334 may carry a drive control current having a same phase (e.g. 0 degrees for both electromagnets). Likewise, the drive control current carried by the pair of electromagnets 382 and 385 may also have a same phase (e.g. 120 degrees). The latter phase may be different from the phase of the drive control current of electromagnets 381 and 384. Similarly, the drive control current carried by the electromagnets 383 and 386 may have a same phase (e.g. 240 degrees), which is different from the two phases associated with the pairs of electromagnets 381/384 and 382/385. Providing pairs of electromagnets having drive control currents with phases that are the same within each pair and different across different pairs facilitates providing a contactless transportation of the mover 140 along the linear stator 130. The phase shifts between the different pairs of electromagnets may be used to provide the horizontal movement of the mover 140 along the transportation track.

While FIG. 3 shows an example of a linear stator having six consecutive stator poles and six respective electromagnets mounted thereto, a linear stator according to the present disclosure may include any number of stator poles. For example, a linear stator may include 2K consecutive stator poles with 2K corresponding electromagnets. For each i, the pair of electromagnets consisting of the i-th electromagnet and the (K+i)-th electromagnet may have a drive control current with a same i-th phase, so that in total K phases are provided. The K phases may be mutually different.

As described herein, each electromagnet may include a coil wound around a respective pole. Different winding schemes for winding the coils can be provided. For example, referring to FIG. 3, the coils of electromagnets 381, 382 and 383 may be wound from top to bottom (clockwise), and the coils of electromagnets 384, 385 and 386 may be wound from bottom to top (counter-clockwise).

Between the electromagnets of adjacent stator poles of a linear stator (e.g. between electromagnets 381 and 382 shown in FIG. 3), one or more permanent magnets may be provided. Such permanent magnets may reduce magnetic short circuits (Halbach array). Further, a linearization of the magnetic field may be provided. Further, energy losses and heat generation may be reduced. Further, a static weight compensation of the carrier can be achieved.

According to embodiments described herein, the reluctance-based vertical force and the reluctance-based drive force may be individually controllable.

The set of electromagnets of the linear reluctance motor may include a first electromagnet. The controller may be configured to control a first current in the first electromagnet to control a magnitude of the reluctance-based vertical force. The controller may be configured to control a second current in the first electromagnet to control a magnitude of the reluctance-based drive force.

The set of electromagnets of the linear reluctance motor may include a first electromagnet and a second electromagnet, for example electromagnets 381 and 384 in FIG. 3. The controller may be configured to control a first current in the first electromagnet and another first current in the second electromagnet to control a magnitude of the reluctance-based vertical force. The controller may be configured to control a second current in the first electromagnet and another second current in the second electromagnet to control a magnitude of the reluctance-based drive force.

The controller may be configured to control a first subset of the set of electromagnets (for example electromagnets 381 and 384 in FIG. 3) to contactlessly transport the carrier by the reluctance-based drive force in the transport direction from a first position to a second position. The controller may be configured to control a second subset of the set of electromagnets (for example electromagnets 383 and 386 in FIG. 3) to contactlessly transport the carrier by the reluctance-based drive force in the transport direction from the second position to a third position.

Figure 4:
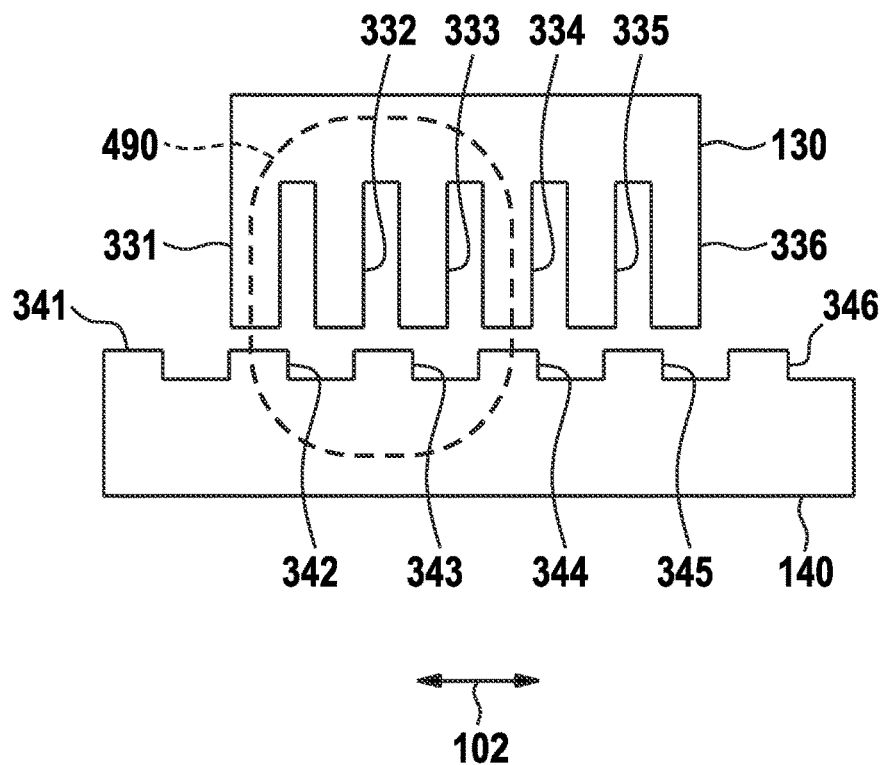

FIG. 4 shows a further example of an operational state of the linear reluctance motor as described herein. FIG. 4 shows a linear stator 130 and the mover 140 in a side view, similar to FIG. 3. The carrier 110, to which the mover 140 is attached, is not shown. Further linear stators may be provided, as described herein. For ease of presentation, the respective electromagnets mounted to the stator poles 331 through 336 of the linear stator 130 are not shown in FIG. 4, but are considered to be provided, similar to FIG. 3. Under the control of the controller 150, the electromagnet mounted to stator pole 331 and the electromagnet mounted to stator pole 334 may be excited to provide a magnetic field 490 according to a closed loop as shown schematically in FIG. 4. The magnetic flux passes through the stator pole 331 and the stator pole 334 and through the mover poles 342 and 344. The mover 140 may be disposed in a position such that the mover pole 342 is aligned with the stator pole 331 and the mover pole 344 is aligned with the stator pole 334, as shown in FIG. 4. Since the poles in question are aligned with each other, the magnetic field 490 does not provide a reluctance-based drive force urging the mover 140 (and the carrier attached to the mover) to move horizontally. Only a reluctance-based vertical force for levitating the mover 140 (and carrier) is provided by the magnetic field 490. The magnetic field 490 may be provided to maintain the carrier in a target position, particularly a target position with respect to the transportation direction 102.

The apparatus 100 may include one or more sensors for measuring or detecting a position of the carrier 110 during contactless levitation and/or transportation. For example, returning to FIG. 2, sensors 270 may be provided on opposite sides of each linear stator 130. Each sensor 270 may be configured to measure a position of the carrier 110, which may include a vertical position and/or a horizontal position of the carrier 110, for example a horizontal position with respect to the transportation direction. The sensors 270 may be Hall-effect based sensors, optical sensors, ultrasonic sensors, capacitive sensors, Eddy current sensors and the like. Each sensor 270 may be connected to the controller 150.

The sensors 270 may be high-precision sensors that have a sensor resolution of 100 μm or less, particularly 10 μm or less. Accordingly, the carrier may be positioned vertically and/or horizontally in a target position with high precision.

The controller 150 may use the position data provided by at least some of the sensors 270 for controlling at least some of the electromagnets to provide the carrier 110 in a target vertical position and/or to provide the carrier in a target horizontal position, for example a horizontal position with respect to the transportation direction. For example, position data provided by two sensors may be combined to determine the vertical position of the mover 140 (levitation position) and the horizontal position of the mover 140 along the transportation track (drive position). Based on the levitation position and drive position of the mover, one or more of the electromagnets are provided with an electrical current, under the control of the controller, to transport the carrier and/or to position the carrier in a target position. In one example, the levitation position can be controlled by controlling the sum of the magnitudes of the individual currents in the electromagnets. The drive position can be controlled by controlling the phases of the respective currents. In another example, the control of the levitation position and the drive position is based on d/q control, wherein the q-component controls the drive position and the d-component controls the levitation position.

An apparatus according to embodiments described herein may include one or more sensors for sensing a position of the carrier with respect to a transportation direction of the carrier. The controller may be configured to control the reluctance-based drive force in response to a signal provided by the one or more sensors to position the carrier in a target position with respect to the transportation direction. The reluctance-based drive force may be configured to align the carrier along the transportation track or transport direction. By controlling amplitude and phase angle separately (even if the amplitude is mainly determined by the carrier weight and therefore its adjustment range is limited) controlling the phase angle between electrical current and mechanical mover position, multiple and continuous levels of jerk, acceleration, velocity, and finally horizontal position can be adjusted and achieved.

As described herein, a linear stator 130 may include a comb structure having a plurality of teeth forming stator poles of the linear stator 130. According to embodiments, and as illustrated in FIGS. 5-6, a linear stator 130 may include two such comb structures arranged side by side with respect to a direction transverse to the transportation direction 102.

Figure 5:
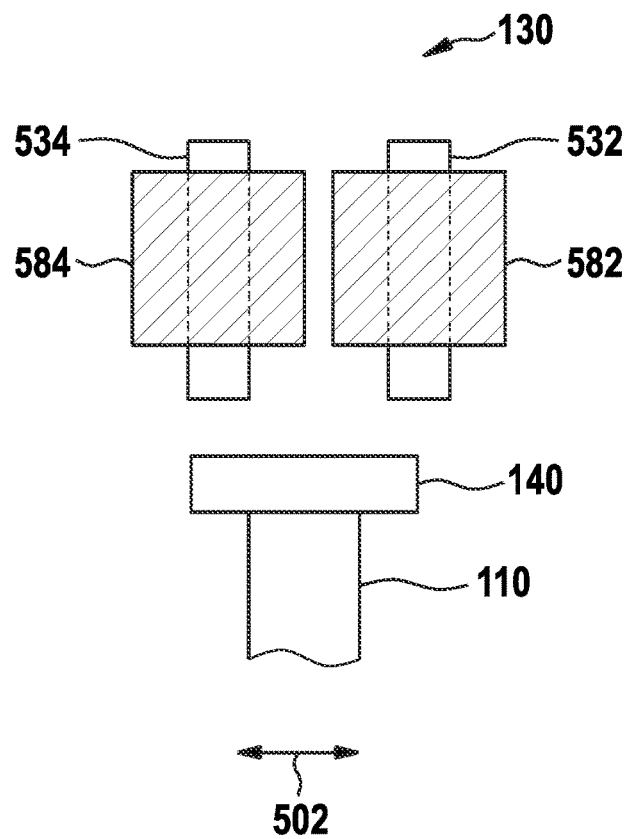
FIGS. 5-6 show a linear reluctance motor of an apparatus for contactless transportation of a carrier according to embodiments described herein, the linear reluctance motor being configured to provide reluctance-based transversal force.

FIG. 5 shows a front view of an example of a linear stator 130 including a first portion 532 and a second portion 534. In FIG. 5, the transportation direction 102 is perpendicular to the drawing plane. The first portion 532 and the second portion 534 face each other. Each of the first portion 532 and the second portion 534 may include, or be, a respective comb structure having a plurality of stator poles forming the teeth of the comb structure. The number of stator poles of the first portion 532 may be equal to the number of stator poles of the second portion 534. Each stator pole of the first portion 532 may face a respective stator pole of the second portion 534. Electromagnets may be mounted to the stator poles of the first portion 532 and to the stator poles of the second portion 534. The electromagnets may be controlled by the controller 150. In the front view of FIG. 5, only the electromagnets 582 and 584 at the respective front ends of the first portion 532 and the second portion 534 are shown.

The first portion 532 and the second portion 534 may be off-set from each other with respect to a transversal direction 502. The transversal direction 502 may be transversal to, particularly perpendicular to, the transportation direction 102. The transversal direction may be a horizontal direction.

Figure 6:
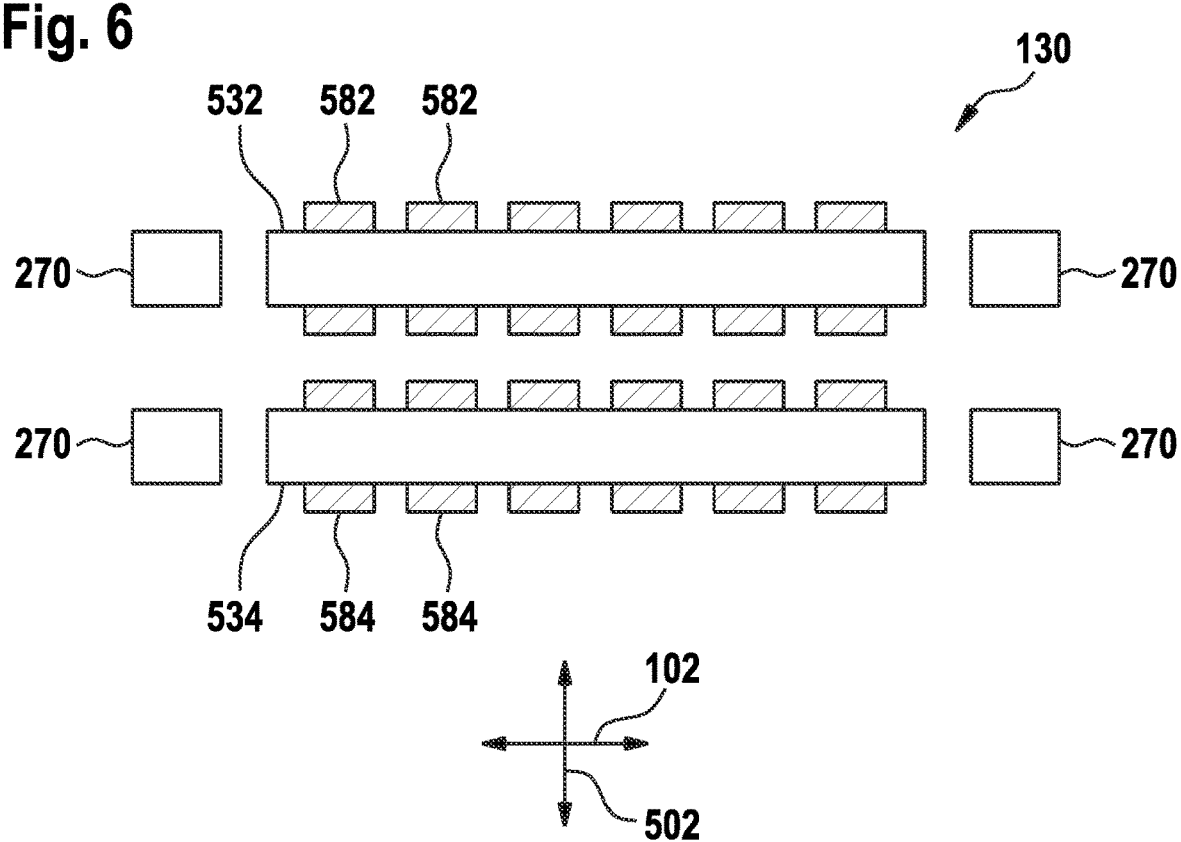

The transportation track as described herein may be defined by a linear arrangement of linear stators 130 of the kind shown in FIGS. 5-6. Accordingly, a single transportation track is formed by a double line of respective comb structures.

FIG. 6 shows a top view of the linear stator 130 of FIG. 5. The first portion 532 may include a first comb structure having a plurality of stator poles. An electromagnet 582 may be mounted to each stator pole of the first portion 532. The second portion 534 may include a second comb structure having a plurality of stator poles. An electromagnet 584 may be mounted to each stator pole of the second portion 534. Two sensors 270 may be provided on opposite ends of the first portion 532. Two sensors 270 may be provided on opposite ends of the second portion 534. The number and spatial arrangement of the sensors 270 in FIG. 6 is exemplary and the disclosure is not limited thereto.

By controlling the magnetic fields generated by at least one electromagnet 582 of the first portion 532 and/or at least one electromagnet 584 of the second portion 534, a magnetic field may be provided that provides a reluctance-based transversal force acting on the mover 140. A transversal force can be understood as a force acting in the transversal direction 502. The reluctance-based transversal force results from the fact that the system strives to reduce or minimize the magnetic reluctance. For example, the electromagnets may be controlled such that a relatively strong magnetic field is generated by at least one of the electromagnets of the first portion 532. Accordingly, the magnetic reluctance is reduced if the mover 140 moves in the transversal direction 502 towards the first portion 532. An attractive force is exerted on the mover 140 (and the carrier 110) to move the mover 140 towards the first portion 532.

Accordingly, by controlling at least one electromagnet of the first portion 532 and/or at least one electromagnet of the second portion 534, the carrier 110 may be contactlessly positioned in a target position with respect to the transversal direction 502. A transversal alignment of the carrier 110 can be provided. The transversal alignment can be provided during transportation of the carrier or during standstill of the carrier. For example, at least one sensor 270 may detect a position of the carrier 110, e.g. a position with respect to the transversal direction 502, and communicate position data relating to said position of the carrier 110 to the controller 150. Based on the position data, the controller 150 can control one or more of the electromagnets to position the carrier 110 in a target position with respect to the transversal direction 502. As described above, the sensors 270 may be high-precision sensors. For example, the sensors 270 may have a sensor resolution of 10 µm or less. Accordingly, the carrier 110 can be positioned with respect to the transportation direction 102 with a high precision of, for example, 100 µm or less, particularly 10 µm or less. Additionally, or alternatively, the sensors 270 may be high resolution sensors with respect to the transversal direction 502, resulting in stable position control in the transversal direction 502 within an accuracy of 100 µm or less. In other embodiments, the motion of the mover 140 in the transversal direction 502 may be used to switch the mover 140 between first portion 532 and second portion 534 within a limited time, e.g. 1 second or less. The sensors 270 then may have a precision of 100 µm or less with respect to the transversal direction 502. In some cases, the measurements with respect to the transversal direction 502 may be omitted, e.g. when only a switch between first portion 532 and second portion 534 is implemented and not a closed position control for any positions in between is desired.

According to embodiments described herein, at least one of the one or more linear stators of the linear reluctance motor may include a first comb structure and a second comb structure. The first comb structure may have N teeth forming first stator poles and the second comb structure may have N teeth forming second stator poles. Each tooth of the first comb structure may face a corresponding tooth of the second comb structure.

According to embodiments described herein, the set of electromagnets of the linear reluctance motor may include one or more first electromagnets and one or more second electromagnets. The one or more first electromagnets may face the one or more second electromagnets with respect to a transversal direction. The controller may be configured to control the one or more first electromagnets and/or the one or more second electromagnets to provide a reluctance-based transversal force acting on the mover. The reluctance-based transversal force may be provided by a magnetic field generated by the one or more first electromagnets and/or the one or more second electromagnets, the magnetic field interacting with the first magnetic material of the linear reluctance motor to provide the reluctance-based transversal force. The reluctance-based transversal force may be configured to position the carrier in a target position with respect to the transversal direction.

According to embodiments described herein, the apparatus may include one or more sensors for sensing a position of the carrier with respect to the transversal direction. The controller may be configured to control the reluctance-based transversal force in response to a signal provided by the one or more sensors to position the carrier in a target position with respect to the transversal direction.

Figure 7:
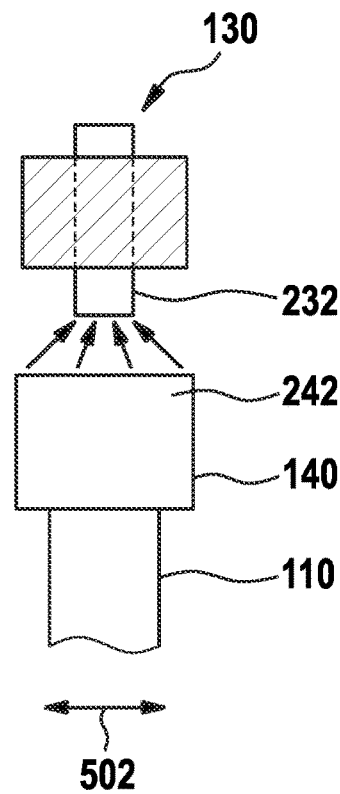
FIG. 7 shows a linear reluctance motor of an apparatus for contactless transportation of a carrier according to embodiments described herein, the linear reluctance motor being configured for self-centering of the carrier.

FIG. 7 shows a further example of a linear reluctance motor as described herein. Different from the example shown in FIGS. 5-6, a linear stator 130 may include a single comb structure. The transportation track may be defined by a linear arrangement of one or more linear stators 130 of the kind shown in FIG. 7, i.e. a single line of respective comb structures. The linear reluctance motor shown in FIG. 7 may be a self-centering system with respect to the transversal direction 502. As shown, the width of a mover pole 242 with respect to the transversal direction 502 may be larger than the width of a stator pole 232 of the linear stator 130 with respect to the transversal direction 502. In light of the larger width of the mover pole 242, the magnetic forces acting on the mover 140 in order to reduce or minimize the magnetic reluctance pull the mover pole 242 towards the center (with respect to the transversal direction 502) of the stator pole 232, as indicated by the arrows in FIG. 7. If an offset between the mover pole 242 and the stator pole 232 occurs with respect to the transversal direction 502 (wherein the mover 140 is either too far to the left of the stator pole 232 or too far to the right of the stator pole 232 in FIG. 7), the magnetic transversal force will urge the mover pole 242 back towards the center line of the stator pole 232. A self-centering system can be provided.

Figure 8:
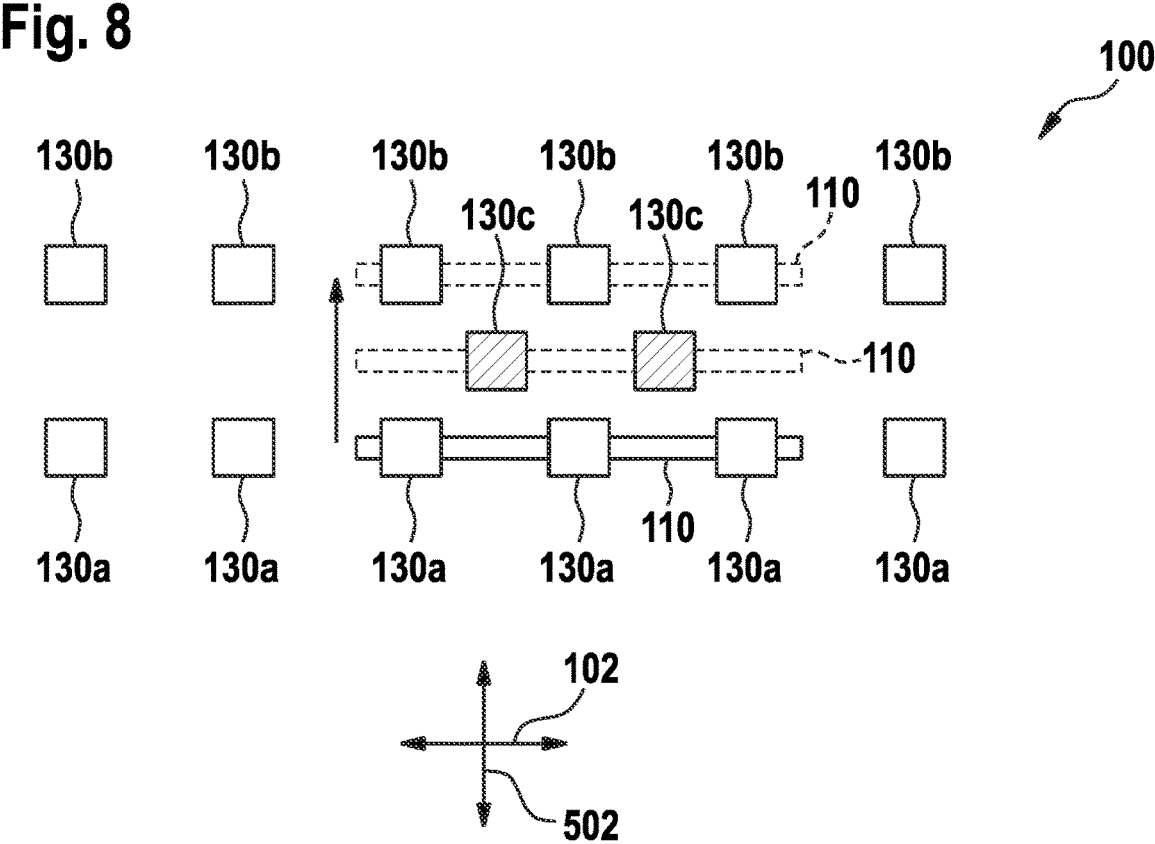
FIGS. 8-10 illustrate a track switch of the carrier in an apparatus for contactless transportation of a carrier according to embodiments described herein.
Figure 9:
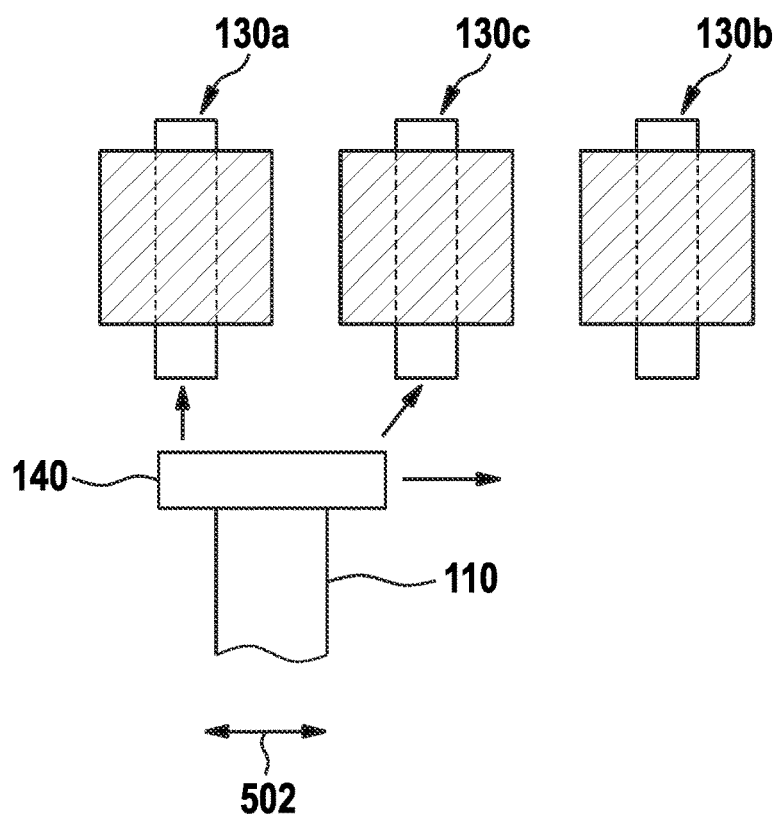

An apparatus 100 according to embodiments described herein may include a first transportation track and a second transportation track, as illustrated in FIG. 8 in a top view and in FIG. 9 in a front view.

The first transportation track may be defined by a first linear arrangement of linear stators 130a. Each linear stator 130a may be any linear stator 130 as described herein. In some embodiments, the linear stators 130a may be self-centering systems as described herein. The first transportation track, or at least a portion thereof, may extend along the transportation direction 102. The carrier 110 may be contactlessly levitated and transported along the first transportation track by a first linear reluctance motor, which may operate in the manner as described herein.

The second transportation track may be defined by a second linear arrangement of linear stators 130b. Each linear stator 130b may be any linear stator 130 as described herein. In some embodiments, the linear stators 130b may be self-centering systems as described herein. The second transportation track, or at least a portion thereof, may extend along the transportation direction 102. The carrier 110 may be contactlessly levitated and transported along the second transportation track by a second linear reluctance motor, which may operate in the manner as described herein.

The first transportation track and the second transportation track may be two separate, independently operable tracks for transportation of a carrier 110 in the vacuum chamber. When a carrier 110 is transported on the first transportation track, the electromagnets of the second transportation track may not take part in the transportation of said carrier, or may not even be switched on in the first place. Vice versa, when a carrier is transported on the second transportation track, the electromagnets of the first transportation track may not take part in the transportation of the carrier, or may not even be switched on.

The first transportation track and the second transportation track may be spaced apart from each other in a track switch direction. The track switch direction may be the transversal direction 502 as described herein.

The apparatus 100 may include one or more track switch linear stators 130c. The one or more track switch linear stators 130c may be provided between the first transportation track and the second transportation track, for example in a region where a track switch of the carrier is envisaged. A track switch linear stator 130c may have the same design as any linear stator 130 as described herein. In some embodiments, a track switch linear stator 130c may be a self-centering system as described herein. The apparatus 100 may be configured for performing a track switch of a carrier 110 from the first transportation track to the second transportation track and/or from the second transportation track to the first transportation track, under the control of the controller 150. The track switch may be performed under the control of the controller 150.

Performing the track switch may include moving the carrier 110 from the first transportation track to an intermediate position between the first transportation track and the second transportation track. The intermediate position is shown in FIG. 8 with dashed lines. In the intermediate position, the carrier is magnetically levitated by the one or more track switch linear stators 130c. The movement from the first transportation track to the intermediate position may be performed by activating one or more electromagnets of the one or more track switch linear stators 130c to provide a magnetic field, wherein the magnetic field provides a first magnetic track switch force that urges the mover 140 to move from the first transportation track to the intermediate position. The first magnetic track switch force may be a force in the track switch direction, which may be the transversal direction 502. The first magnetic track switch force may result from the fact that the stator/mover system strives to reach a state of minimal, or at least reduced, magnetic reluctance. The track switch movement is based on similar principles as the transversal alignment of the carrier as described herein. FIG. 9 shows the carrier 110 during the movement from the first transportation track to the intermediate position.

Performing the track switch may include moving the carrier 110 from the intermediate position to the second transportation track. After said movement, the carrier is provided on the second transportation track, as shown in FIG. 8 with dashed lines. The movement from the intermediate position to the second transportation track may be performed by activating one or more electromagnets of one or more linear stators 130b to provide a magnetic field, wherein the magnetic field provides a second magnetic track switch force that urges the mover 140 to move from the intermediate position to the second transportation track. The second magnetic track switch force may be a force in the track switch direction, which may be the transversal direction 502. The second magnetic track switch force may result from the fact that the stator/mover system strives to reach a state of minimal, or at least reduced, magnetic reluctance.

Figure 10:
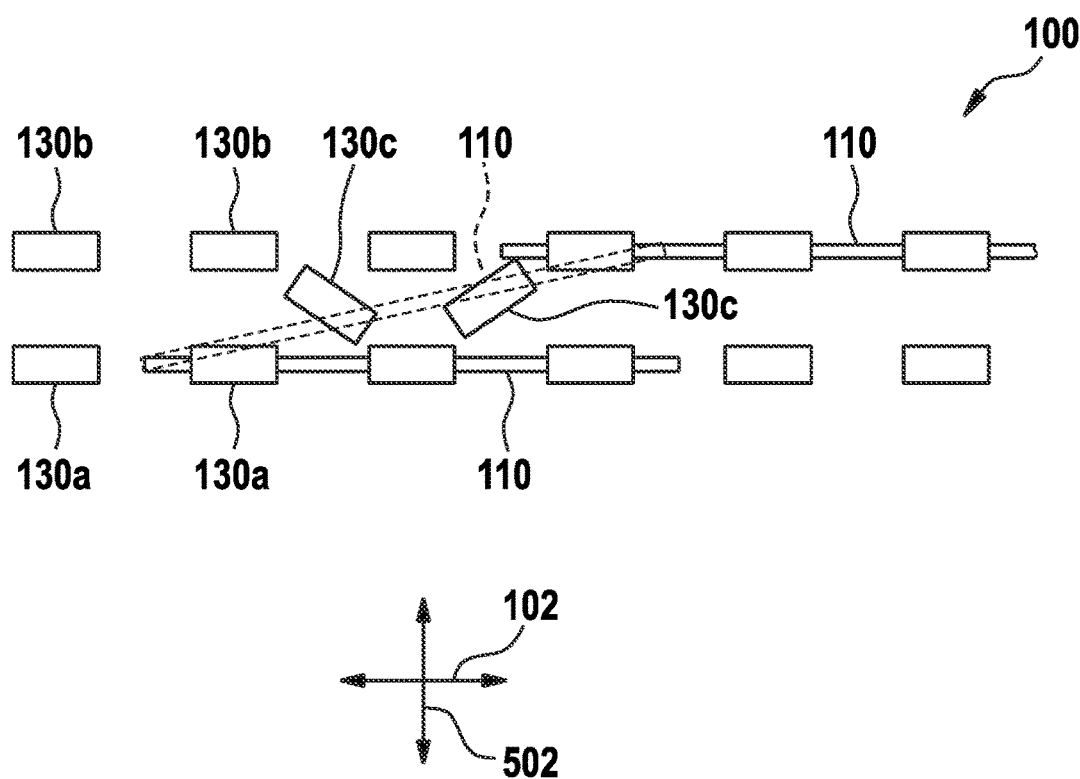

As shown in FIG. 10, one or more track switch linear stators 130c may be arranged in a tilted configuration. A tilted configuration may include that a longitudinal axis defined by a length of a track switch linear stator 130c is inclined with respect to a longitudinal axis defined by a length of a linear stator 130a of the first transportation track and/or with respect to a longitudinal axis defined by a length of a linear stator 130b of the second transportation track. For example, a longitudinal axis defined by a length of a track switch linear stator 130c may be inclined with respect to the transportation direction 102. The tilted configuration of the one or more track switch linear stators 130c may facilitate a track switch of the carrier 110 during transportation of the carrier 110, so that the track switch may be performed without stopping the carrier 110. The carrier 110 may move from the first transportation track to an intermediate position and from the intermediate position to the second transportation track in a continuous motion. As shown in the example in FIG. 10, in the intermediate position (indicated with dashed lines), the orientation of the carrier 110 may be inclined with respect to the first transportation track and/or the second transportation track. In the inclined orientation of the carrier, the tilted configuration of the one or more track switch linear stators 130c has the advantage that an overlap between the mover 140 and the one or more track switch linear stators 130c is enlarged, so that the one or more track switch linear stators 130c can interact more strongly with the mover 140. A stable track switch motion can be provided, allowing the track switch to be performed without halting the carrier 110.

According to embodiments described herein, the linear reluctance motor as described herein may be a first linear reluctance motor of the apparatus, and the transportation track may be a first transportation track. The apparatus may include a second linear reluctance motor for contactlessly transporting the carrier along a second transportation track. The apparatus may include a track switch reluctance motor including one or more track switch linear stators for switching the carrier between the first transportation track and the second transportation track. The track switch may be provided by a reluctance-based track switch force provided at least by the track switch reluctance motor.

In some embodiments, one or more track switch linear stators may be disposed in a tilted orientation with respect to at least one of the first transportation track and the second transportation track.

In some embodiments, the stators may be enlarged at a location where the track switch is performed. In doing so, a reduction of the number of additional stators can be achieved. For example, one linear stator can cover both tracks, combining for example the linear stators 130a, 130b and 130c in one larger stator.

Figure 11:
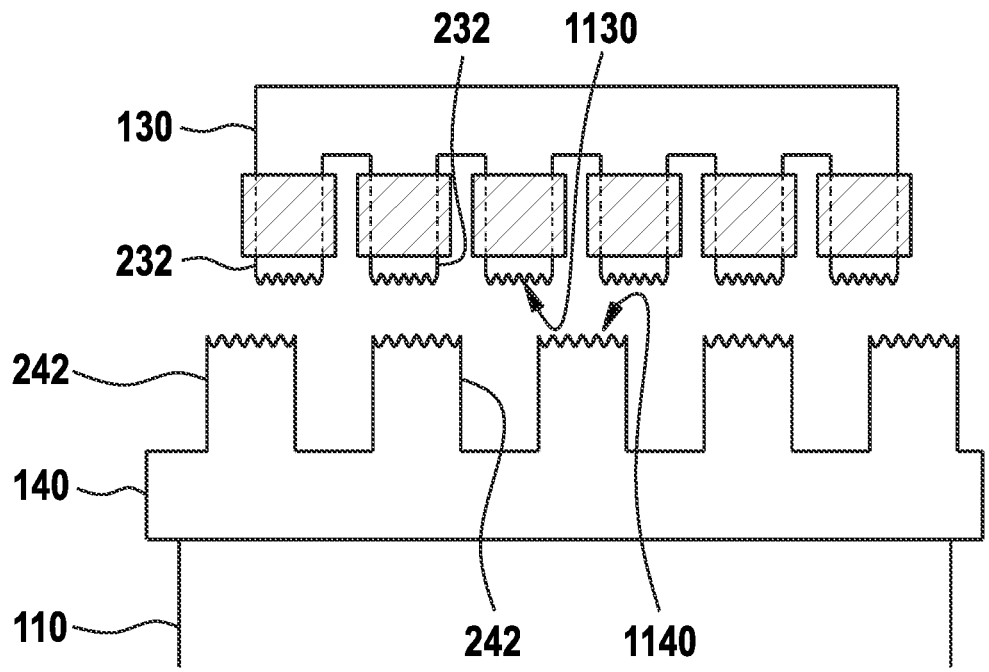
FIGS. 11-13 show an apparatus for contactless transportation of a carrier according to embodiments described herein, wherein the stator poles and mover poles have protrusions or openings for providing a fine-alignment of the carrier.

FIG. 11 shows a portion of the apparatus 100 according to a further embodiment. One or more stator poles 232 of a linear stator 130 may include a pattern 1130 including a plurality of protrusions. For example, 2 or more, particularly 3 or more, more particularly 6 or more protrusions may be provided on a stator pole. The pattern 1130 may be provided on a distal surface of the stator pole 232. The distal surface may be configured to face the mover 140. The pattern 1130 may be an undulating pattern having peaks and valleys, where the peaks form the protrusions of the pattern. The width of a protrusion or peak with respect to the transportation direction may be, for example, from 1 mm to 5 mm. The distance between two protrusions of a stator pole with respect to the transportation direction may be, for example, from 2 mm to 10 mm. In some embodiments, the pattern of protrusions may be covered with a flat surface. A flat surface can optimize the vacuum performance of the transportation system.

Additionally or alternatively, one or more mover poles 242 of the mover 140 may include a pattern 1140 including a plurality of protrusions. The pattern 1140 may be provided on a distal surface of a mover pole 242. The distal surface may be configured to face the stator 130. The pattern 1140 may be an undulating pattern having peaks and valleys, similar to the patterns provided on the stator poles 232. The number of protrusions, and the dimensions of the peaks and valleys may be the same as described above.

The patterns of protrusions provided on the stator poles and/or mover poles facilitate a fine-alignment of the carrier, such as a fine-alignment in a horizontal direction along the transportation track. The protrusions function as micro-poles that strive to align with each other in order to reduce or minimize the magnetic reluctance of the stator/mover system when a magnetic field is provided as described herein. In light of the small dimensions of the protrusions in question, the accuracy that can be obtained for positioning the carrier can be increased.

Figure 12:
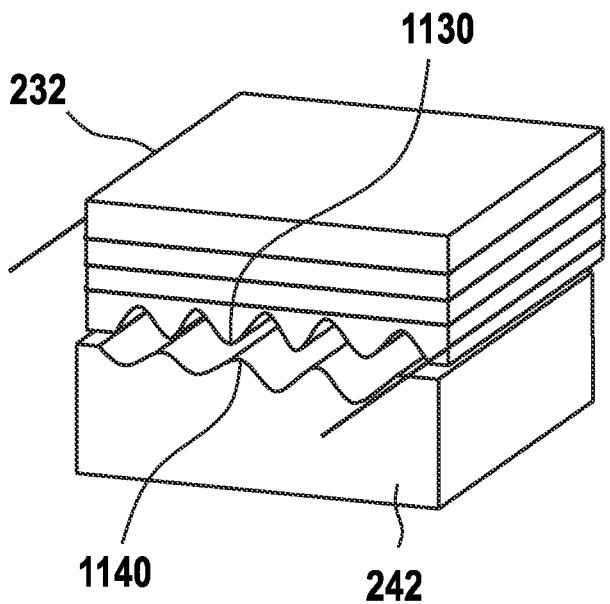

FIG. 12 shows a close-up view of a portion of a stator pole 232 including a pattern 1130 and a portion of a mover pole 242 including a pattern 1140.

Figure 13:
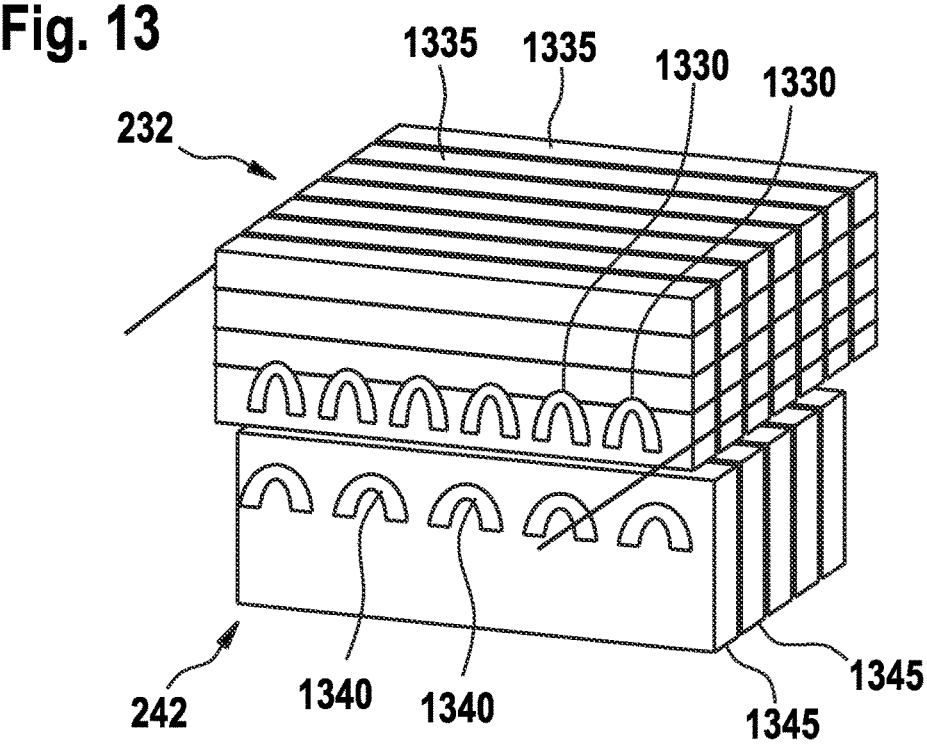

FIG. 13 shows a close-up view of a portion of a stator pole 232 and a portion of a mover pole 242 according to a further example.

One or more stator poles 232 of a linear stator 130 may include a pattern 1330 including a plurality of openings or slits. The pattern 1330 may be provided on a distal surface of the stator pole 232. The pattern 1330 may be an undulating pattern having peaks and valleys. The number of openings, as well as the dimensions of the peaks and valleys, can be the same as described above for the patterns 1130 and 1140. Each opening or slit may be U-shaped. The openings or slits may include a gas, such as air. The openings or slits may be empty. Alternatively, the openings or slits may include a material, such as an epoxy material, a ceramic material or a permanent magnet.

Additionally or alternatively, one or more mover poles 242 of the mover 140 may include a pattern 1340 including a plurality of openings or slits. The pattern 1340 may be provided on a distal surface of a mover pole 242. The pattern 1340 may be an undulating pattern having peaks and valleys, and/or may be filled with gas or materials, similar to the patterns 1330.

The function and effect of the patterns 1330 and 1340 containing the openings or slits is similar to that of the patterns 1130 and 1140 containing protrusions. That is to say, both kinds of patterns facilitate a fine-alignment of the mover with respect to the stators.

In further embodiments, alternative or in addition to the patterns 1130/1140 containing protrusions and the patterns 1330/1340 containing openings, internal variations, or modifications, of the magnetic resistance of the material of one or more stator poles may be provided. Such variations also facilitate a fine-alignment of the mover with respect to the stators.

At least one of the one or more linear stators may include stator poles. The mover may include mover poles. At least one stator pole may include a pattern having a plurality of protrusions, a plurality of openings and/or a variation of magnetic properties configured for a contactless fine-alignment of the carrier, particularly a contactless fine-alignment with respect to the transportation direction. At least one mover pole may include a pattern having a plurality of protrusions, a plurality of openings and/or a variation of magnetic properties configured for a contactless fine-alignment of the carrier, particularly a contactless fine-alignment with respect to the transportation direction.

The plurality of protrusions of a pole as described herein (a stator pole or a mover pole) may be arranged next to each other in the transport direction. The plurality of protrusions can be formed on an outer surface at a distal end of the pole. Each protrusion may project from the outer surface, e.g. in a vertical direction. An opening in a pole may be formed in an interior or body portion of the pole. The plurality of openings of a pole may be arranged next to each other in the transport direction. The plurality of openings may be formed adjacent to an outer surface at a distal end of the pole. Each opening may include, for example, air, an epoxy material, a ceramic material, or a magnetic material, e.g. a permanent magnet, or the like. An opening in a pole may be shaped as a curved slit.

As further shown in FIG. 13, and applicable to any embodiment described herein, a stator pole 232 and/or a mover pole 242 may include, or be made of, a stack of metal plates or sheets 1335 and/or 1345, such as ferromagnetic sheets. Such a configuration has several advantages, including cost-efficiency and reduction of losses.

Figure 14:
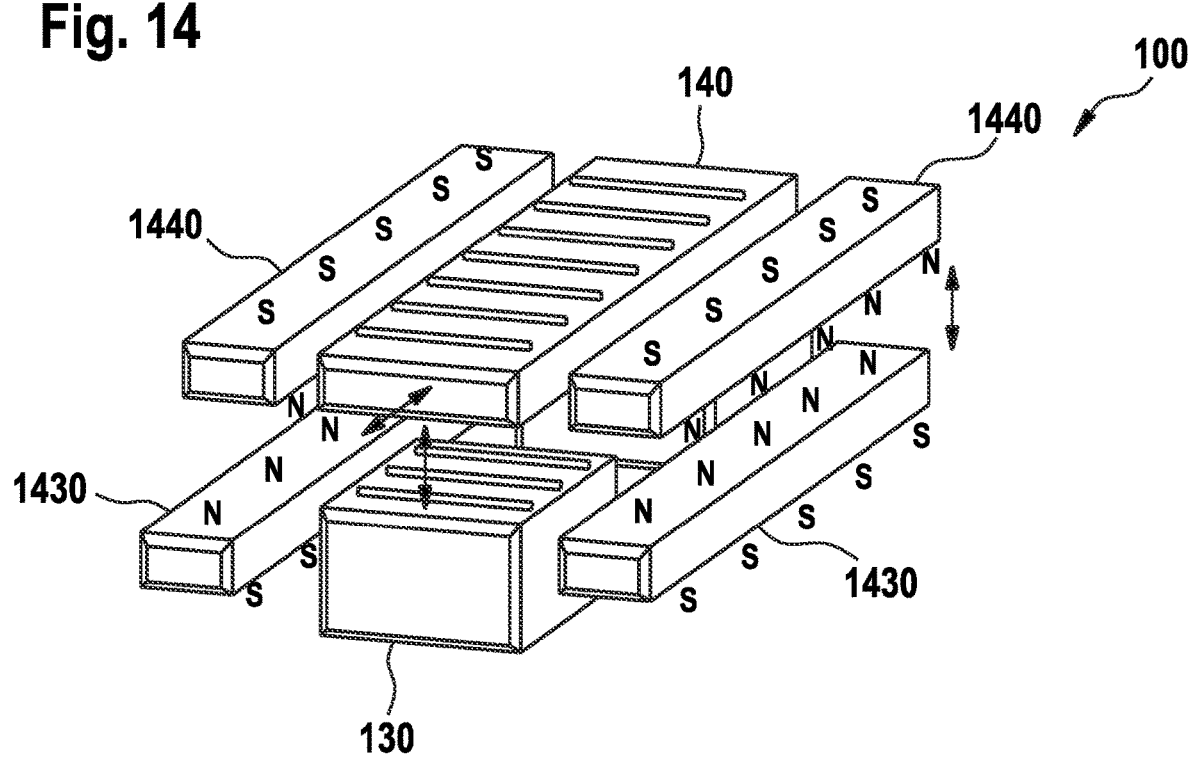
FIG. 14 shows an apparatus for contactless transportation of a carrier according to embodiments described herein, wherein the one or more stators are disposed below the levitated carrier.

FIG. 14 shows an example of an apparatus 100 wherein the one or more linear stators 130 are disposed below the mover 140.

A single linear stator 130 is shown in FIG. 14, but the disclosure is not limited thereto, and further linear stators 130 can be provided. The linear stator(s) 130 may have any design of a linear stator as described herein.

The carrier 110 is not shown in FIG. 14, and may be provided, for example, on top of the mover 140, particularly in a horizontal orientation of the carrier 110. The apparatus 100 shown in FIG. 14 may be adapted for a contactless transport of a carrier 110 in a horizontal orientation of the carrier 110. For example, the carrier may be configured for supporting one or more substrates, such as semiconductor wafers, in a horizontal orientation. The controller is not shown in FIG. 14 but is considered to be part of the apparatus 100.

A linear stator 130 may include one or more permanent magnets 1430. For example, two permanent magnets 1430, or two arrays of permanent magnets, may be disposed on opposite sides of the linear stator 130. The mover 140 may include one or more permanent magnets 1440. For example, two permanent magnets 1440, or two arrays of permanent magnets, may be disposed on opposite sides of the mover 140.

The one or more permanent magnets 1430 may be configured to face the one or more permanent magnets 1440 so as to provide a repulsive magnetic force. Like poles of the one or more permanent magnets 1430 and the one or more permanent magnets 1440 may face each other. The repulsive magnetic force may be an upward force, i.e. magnetic levitation force, that lifts the mover 140 above the one or more stators 130. The repulsive force may be a constant, non-adjustable force.

The linear stator 130 may include one or more electromagnets for generating a controllable magnetic field that interacts with the mover 140, as described herein. The magnetic field may provide an attractive magnetic force (reluctance-based force) that urges the mover 140 towards a position such that the magnetic reluctance of the stator/mover system is reduced or minimized, as described herein. The attractive magnetic force includes a reluctance-based drive force acting in a horizontal direction, as described herein. Further, the attractive magnetic force also includes a reluctance-based vertical force. Different from an apparatus where the mover 140 is below the linear stator 130, in the configuration of FIG. 14 the reluctance-based vertical force will pull the carrier 110 downward, i.e. towards the linear stator 130. The downward vertical force is compensated by the upward force provided by the one or more permanent magnets 1430 and the one or more permanent magnets 1440. By suitably controlling the downward reluctance-based vertical force, which can be done by controlling the electromagnets (using the controller 150 of the apparatus 100), the contactless levitation of the carrier 110 can be precisely controlled and the carrier 110 can be positioned in a target vertical position above the linear stator 130.

Further approaches for transporting a carrier in a horizontal orientation may be provided. For example, two parallel tracks of linear stators may be provided, having the advantage of allowing a control of the yaw, pitch and roll of the carrier. Vibrations or undesired motion can be avoided or at least controlled. In another embodiment, the tracks may be in a parallel orientation similar to FIG. 6, but horizontally aligned. The carrier may be attracted without using permanent magnets.

An apparatus according to embodiments described herein may include a processing chamber, such as a vacuum chamber. The carrier may be configured to be transported in the processing chamber.

According to embodiments, a linear stator 130 as described herein may have a vacuum tight sealing. To achieve a vacuum tight sealing, a vacuum tight membrane may be provided. The vacuum tight membrane may be disposed between stator poles and mover poles. The magnetic field for levitation and transportation may protrude the vacuum tight membrane. The vacuum tight membrane may separate the outer atmospheric pressure from the internal low-pressure area. A maximum cleanliness inside the low-pressure area can be achieved. Alternatively, the vacuum tight sealing may be introduced on the upper side of the linear stator 130, whereby the stator poles are exposed to the low-pressure area and the magnetic field for levitation and transportation does not protrude the membrane. The latter alternative avoids the need for a separator membrane between stator and mover and maximizes the efficiency of the device, but results in a less cleanliness construction.

Figure 15:
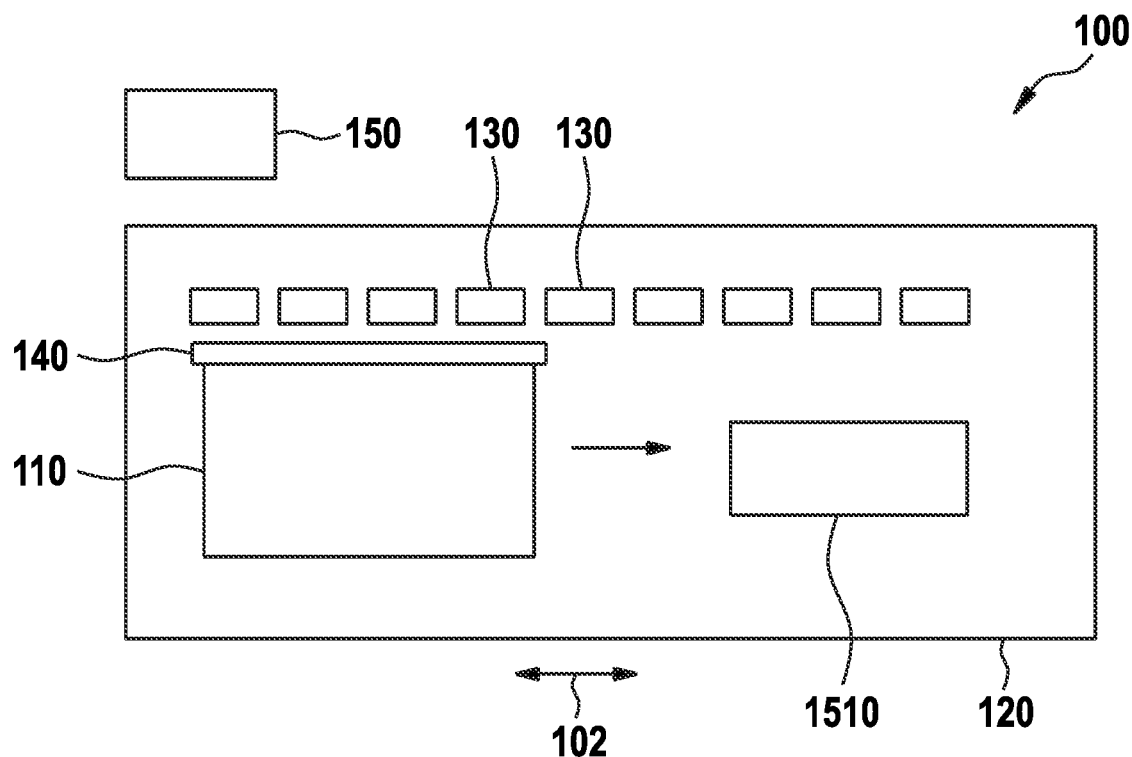
FIGS. 15-16 show a processing system for processing a substrate. The processing system includes an apparatus for contactless transportation of a carrier according to embodiments described herein.
Figure 16:
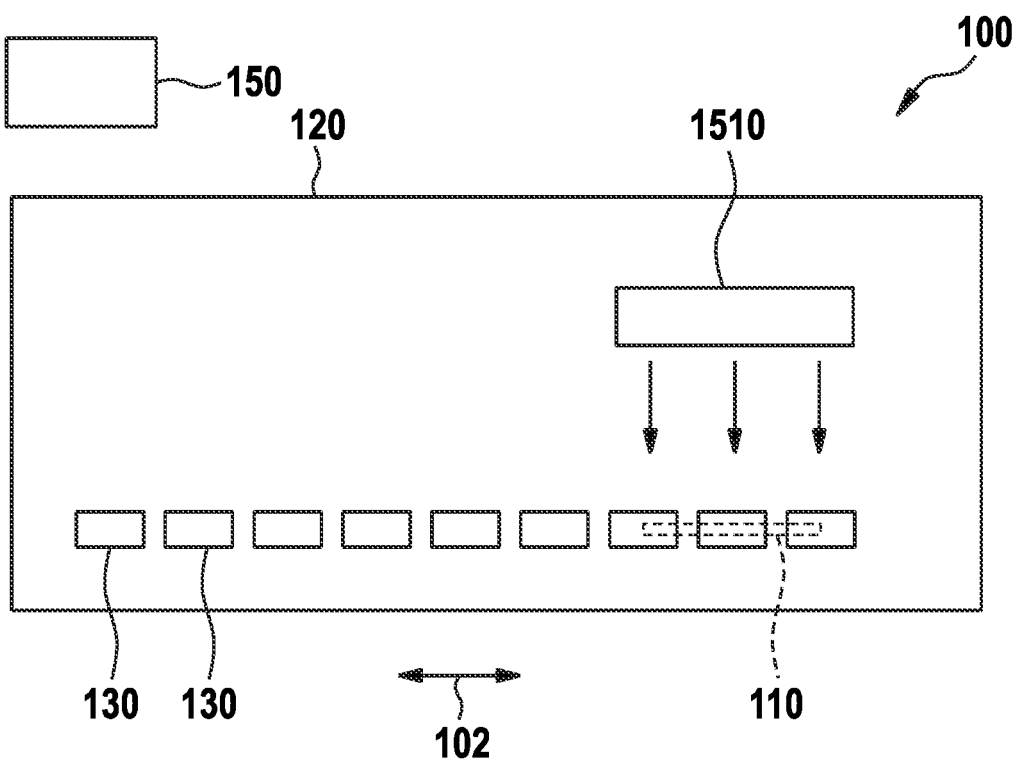

According to a further embodiment, and as illustrated in FIGS. 15-16, a processing system for processing a substrate is provided. The processing system includes an apparatus 100 for a contactless transportation of a carrier 110 as described herein, the carrier being a substrate carrier. The processing system includes a processing device 1510, such as a deposition source or an inspection device. The linear reluctance motor of the apparatus 100 may be configured to contactlessly transport the carrier 110 to a processing position (e.g. the position of the carrier 110 shown in FIG. 16). In the processing position, the carrier 110 may be arranged for processing of a substrate supported by the carrier using the processing device. The processing position may be a deposition position. In the deposition position, the substrate held by the carrier may receive a deposition material from a deposition source. For example, in FIGS. 15-16, the processing device 1510 may be a deposition source for depositing a deposition material on a substrate carried by the carrier 110.

According to embodiments, a carrier may include a slit for receiving a substrate, particularly in a horizontal orientation of the substrate.

Figure 17:
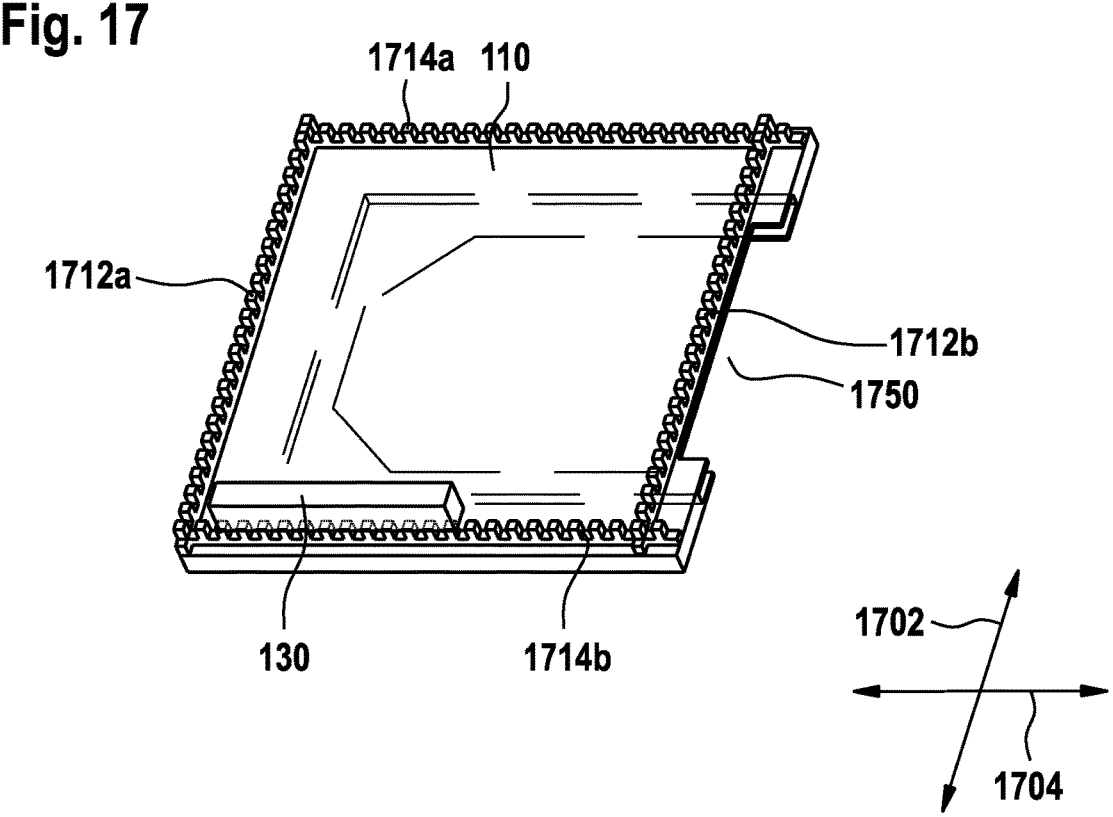
FIG. 17 shows an example of a carrier including a slit for receiving a substrate.

FIG. 17 shows an example of a carrier 110. As shown in FIG. 17, a carrier 110 may be configured for receiving a substrate, e.g. a semiconductor wafer, in a horizontal orientation of the substrate. The carrier 110 may include an opening 1750 for receiving the substrate. The opening 1750 may be shaped as a slit in which the substrate may be held. A slit can be understood as a narrow opening for receiving the substrate. The carrier may have support portions in a peripheral region of the slit for supporting the substrate. The slit may be shaped to cover the substrate only in a peripheral region of the substrate. A bulk area of the substrate held in the slit may be exposed, allowing the bulk area to be processed, e.g. coated. For example, in FIG. 17, when a substrate is held by the carrier 110, the bottom surface of the substrate is largely exposed, so that said surface can be processed. In an alternative example, the substrate can be unloaded from the carrier 110 prior to processing, e.g. coating, of the substrate. The coating can be performed without restricting the area for coating of the substrate. No coating will reach the carrier, since the carrier does not participate in the coating process. In this example, the opening 1750 can be small. The carrier can provide protection to the substrate during transportation.

According to embodiments, the mover that is attached to the carrier may include a first set of mover poles forming a linear arrangement extending in a first direction for providing a movement of the carrier in the first direction and a second set of mover poles forming a linear arrangement extending in a second direction for providing a movement of the carrier in the second direction.

As shown in FIG. 17, the mover 140 that is attached to the carrier 110 may include a set of mover poles 1712*a* forming a linear arrangement extending in a first direction 1702, which may be a first horizontal direction. Optionally, the mover 140 may include another set of mover poles 1712*b* forming a linear arrangement extending in the first direction 1702. In other words, the mover 140 may include two parallel sets of mover poles 1712*a* and 1712*b* both extending in the first direction 1702. The set of mover poles 1712*a* and/or the set of mover poles 1712*b* may be arranged to provide a movement of the carrier 110 in the first direction 1702. The apparatus may include at least one linear stator extending in the first direction 1702 and arranged to interact with the set of mover poles 1712*a* and/or the set of mover poles 1712*b* for providing a movement of the carrier 110 in the first direction 1702.

The mover 140 may include a set of mover poles 1714*a* forming a linear arrangement extending in a second direction 1704, which may be a second horizontal direction. The second direction 1704 may be perpendicular to the first direction 1702. Optionally, the mover 140 may include another set of mover poles 1714*b* forming a linear arrangement extending in the second direction 1704. The set of mover poles 1714*a* and/or the set of mover poles 1714*b* may be arranged to provide a movement of the carrier 110 in the second direction 1704. The apparatus may include at least one linear stator extending in the second direction 1704 and arranged to interact with the set of mover poles 1714*a* and/or the set of mover poles 1714*b* for providing a movement of the carrier 110 in the second direction 1704. FIG. 17 exemplary shows a linear stator 130 extending in the second direction 1704. For ease of presentation, only one linear stator is shown, yet it shall be understood that the apparatus can include a plurality of linear stators extending in the first direction and/or a plurality of linear stators extending in the second direction.

While FIG. 17 shows a combination of two aspects, namely a first aspect involving a slit-shaped carrier and a second aspect involving sets of mover poles extending in different directions, it shall be understood that these two aspects can be provided separately, i.e. not necessarily in combination with each other.

According to embodiments, the apparatus may include a plurality of linear stators. The plurality of linear stators may include a first module and a second module. The first module may include linear stators disposed according to a first pattern, including at least one linear stator extending in a first direction and at least one linear stator extending in a second direction. The second module may include linear stators disposed according to a second pattern, including at least one linear stator extending in the first direction and at least one linear stator extending in the second direction.

The first pattern and the second pattern may be configured such that the second module can be placed adjacent to a first side of the first module to provide a first transportation path extending in the first direction from the first module to the second module and such that the second module can be placed adjacent to a second side of the first module to provide a second transportation path extending in the second direction from the first module to the second module.

Figure 18:
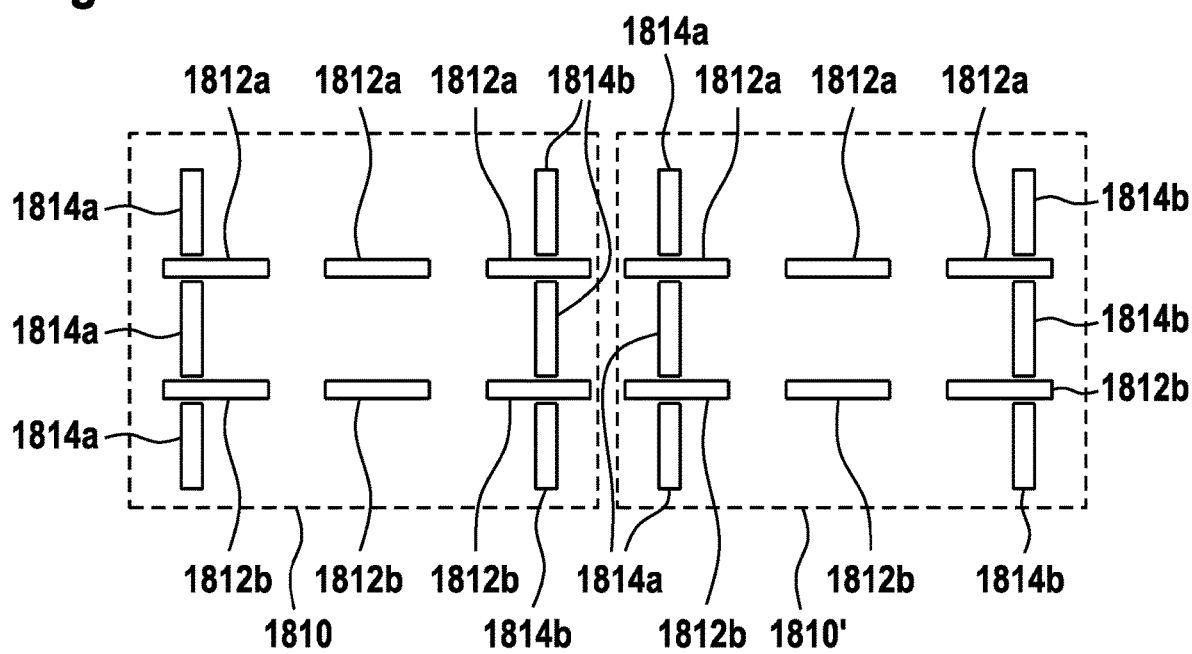
FIG. 18 shows an example of modules, or tiles, including linear stators disposed according to a pattern.

FIG. 18 shows an example of a first module 1810 including linear stators disposed according to a first pattern and a second module 1810' including linear stators disposed according to a second pattern. The first pattern may have the same shape as the second pattern. Both modules may be duplicates of each other.

A module, which may be the first module 1810 or the second module 1810', may also be called a tile. The module may include linear stators arranged according to a pattern. The module may include a set of linear stators 1812a forming a linear arrangement extending in a first direction, particularly a first horizontal direction. The module may include a set of linear stators 1814a forming a linear arrangement extending in a second direction, particularly a second horizontal direction. The second direction may be perpendicular to the first direction. The second direction may be provided with respect to the first direction at an angle different than 90 degrees. The module may optionally include a further set of linear stators 1812b forming a linear arrangement extending in the first direction. The module may optionally include a further set of linear stators 1814b forming a linear arrangement extending in the second direction.

FIG. 18 shows the second module 1810' being disposed adjacent to a first side of the first module 1810. In FIG. 18, the first side of the first module 1810 is the right-hand side of the first module 1810. When the second module 1810' is disposed as shown in FIG. 18, a first transportation path extending in the first direction may be defined by the set of linear stators 1812a/1812b of the first module 1810 and the set of linear stators 1812a/1812b of the second module 1810'. The first transportation path defines a transportation of the carrier from the first module 1810 to the second module 1810' (or vice versa) in the first direction.

Not shown in FIG. 18, the second module 1810' can alternatively be disposed adjacent to a second side of the first module 1810. The second side of the first module 1810 may be the bottom side of the first module 1810 in FIG. 18. When the first module 1810 and the second module 1810' are arranged accordingly, at least a portion of a second transportation path extending in the second direction may be defined by the set of linear stators 1814a of the first module 1810 and the set of linear stators 1814a of the second module 1810'. The second transportation path defines a transportation of the carrier from the first module 1810 to the second module 1810' (or vice versa) in the second direction.

According to embodiments, a plurality of modules of the kind shown in FIG. 18 can be disposed next to each other to define a transport path, or a plurality of transport paths, for the carrier. Each transport path may have portions extending in the first direction, portions extending in the second direction and/or respective portions in both directions. Any desired transportation path or pattern of transportation paths can be formed in a modular manner by placing the modules, or tiles, in a suitable way.

The linear stators shown in FIG. 18 may include any feature or feature combination of a linear stator 130 as described herein.

In some embodiments, the arrangement of linear stators shown in FIG. 18 can be for use with a carrier as shown in FIG. 17. Yet, the disclosure is not limited thereto.

According to embodiments, any linear stator as described herein may include one or more stator poles, wherein each stator pole of the one or more stator poles is inclined with respect to a vertical direction. The one or more stator poles may be a set of stator poles forming a linear arrangement extending in a first direction. The first direction may be a horizontal direction. The set of stator poles may define at least a portion of a transportation path of the carrier in the first direction.

Figure 19:
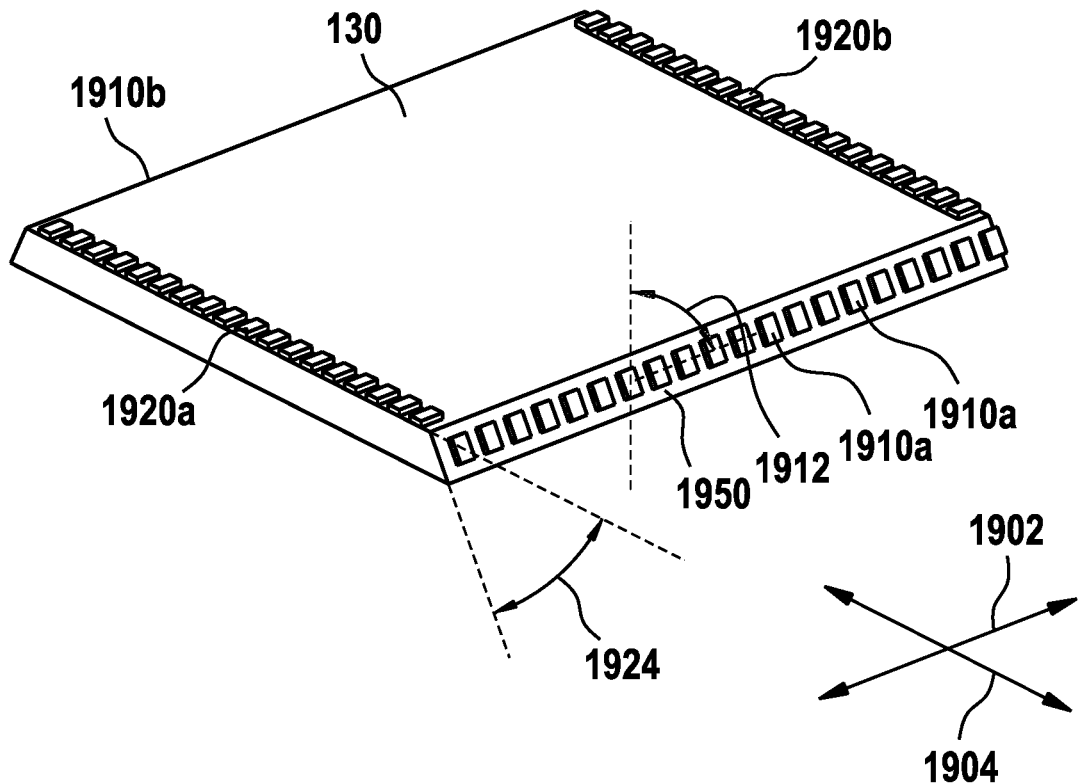
FIG. 19 shows an example of a linear stator having inclined stator poles.

FIG. 19 shows an example of a linear stator 130. The linear stator 130 may have a set of stator poles 1910a. The set of stator poles 1910a may form a linear arrangement that extends in a first direction 1902. The first direction 1902 may be a horizontal direction. The set of stator poles 1910a may define at least a portion of a transportation path of the carrier in the first direction 1902. Each stator pole 1910a may be inclined, i.e. tilted, at an inclination angle 1912 with respect to a vertical direction. The inclination angle 1912 may be an angle between a vertical direction and an axis defined by a length extension of the stator pole 1910a. The inclination angle 1912 may be 90 degrees or less and/or 10 degrees or more. The set of stator poles 1910a may be disposed on a surface 1950, particularly a side surface, of the linear stator 130. Each stator pole 1910a may project, or protrude, from the surface 1950, e.g. in a direction perpendicular to the surface 1950. The surface 1950 may have an inclination angle 1924 with respect to a horizontal direction. The inclination angle 1924 of the surface 1950 may result in the inclination of the stator poles 1910a at the inclination angle 1912. The linear stator 130 may have a set of inclined stator poles 1910b on an opposite side of the linear stator 130, similar to the stator poles 1910a.

The provision of stator poles having an inclined orientation is beneficial for allowing the carrier to be transported at an increased acceleration. In the conventional case of vertically, i.e. non-inclined, stator poles, the maximum amount of drive acceleration (resulting from the reluctance-based drive force) of the carrier that can be provided by the linear reluctance motor has an upper bound that is determined by the maximum reluctance-based vertical force, which is in turn determined by the weight of the carrier. Accordingly, earths gravitational acceleration places an upper bound on the maximum possible acceleration for transporting the carrier (if the carrier has a higher weight, the carrier would accelerate slower i.e. more force is needed to accelerate the carrier). By inclining the stator poles, this effect can be reduced, that is to say, the inclination of the stator poles allows having a larger reluctance-based drive force for the same weight of the carrier. Due to the inclination, the carrier can be transported with a higher acceleration. In addition, the tilted stator poles facilitate an active side-guiding of the carrier during transportation, i.e. a control of the position of the carrier in a direction transversal to the transport direction, either during transportation or in standstill.

Instead of, or in addition to, inclined stator poles 1910a and/or 1910b as shown in FIG. 19, a higher acceleration of the carrier in the transport direction may be provided by pulling the carrier downwards using magnets in order to increase the force in vertical direction, which means the virtual weight, without increasing the mass. Accordingly, the acceleration can be increased and is not limited by the gravity at the location where the system is used.

Returning to FIG. 19, the linear stator 130 may include a set of stator poles 1920a forming a linear arrangement extending in a second direction 1904. The second direction 1904 may be horizontal direction, which may be perpendicular to the first direction 1902. The stator poles 1920a may be non-inclined, i.e. vertically oriented, poles. The set of stator poles 1920a may define at least a portion of a transportation path of the carrier in the second direction 1904. Since the stator poles 1920a are not inclined, the carrier can be transported with high precision and with high efficiency for levitation, holding or parking. The linear stator 130 may have a set of non-inclined stator poles 1920*b* on an opposite side of the linear stator 130, similar to the stator poles 1920*a*. In another example, it may be the case that the stator poles or mover poles do not necessarily protrude out of the plane 1950 but can also be modulated into the material, as shown in FIG. 13.

The mover may include a set of mover poles arranged to interact with the stator poles 1910*a-b* and/or a set of mover poles arranged to interact with the stator poles 1920*a-b*.

The exemplary linear stator 130 of FIG. 19 includes a combination of inclined stator poles 1910*a-b* and non-inclined stator poles 1920*a-b*. The disclosure is not limited thereto. A linear stator may include only one of the sets of stator poles in question.

According to embodiments, any linear stator as described herein may include a set of stator poles arranged to provide a reluctance-based angular force for moving the carrier over an angle. The reluctance-based angular force may cause a rotation of the carrier with respect to a vertical rotation axis. The reluctance-based angular force may be a horizontal force.

Figure 20:
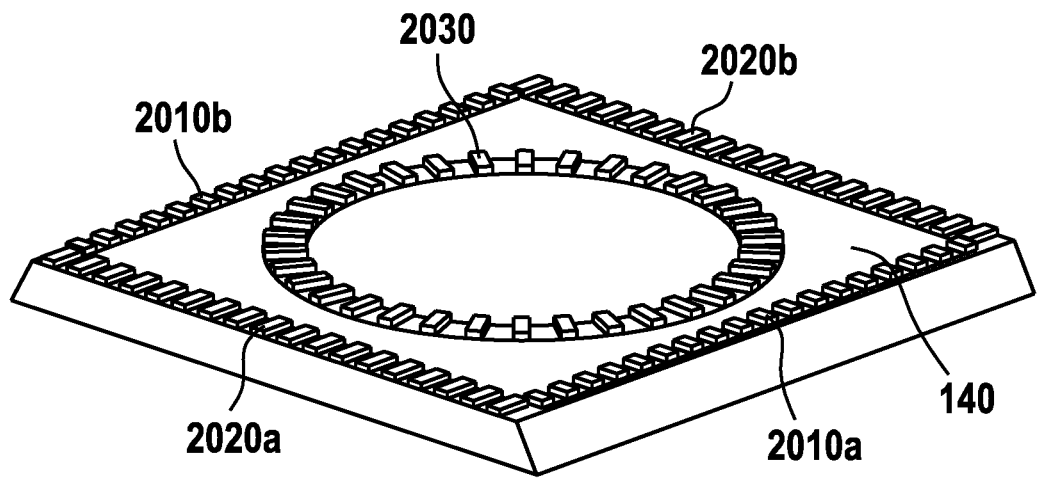
FIGS. 20-21 show examples of linear stators having a set of stator poles arranged to provide a reluctance-based angular force for moving a carrier over an angle.

FIG. 20 shows an example of a mover 140. The mover 140 may include at least one of a set of mover poles 2010*a*, a set of mover poles 2010*b*, a set of mover poles 2020*a* and a set of mover poles 2020*b*. The mover poles 2010*a-b* and 2020*a-b* may be similar to the stator poles 1920*a-b* in FIG. 19, i.e. non-inclined poles. Alternatively, at least one of the set of mover poles 2010*a-b* and the set of mover poles 2020*a-b* may include inclined mover poles, similar to the stator poles 1910*a-b* in FIG. 19. A linear stator may include a set of stator poles arranged to interact with the mover poles 2010*a-b* and/or a set of stator poles arranged to interact with the mover poles 2020*a-b*.

The mover 140 may include a set of mover poles 2030 arranged to provide a reluctance-based angular force configured for moving the carrier over an angle. As shown, the mover poles 2030 may be disposed in a curved arrangement, particularly a circular arrangement. The disclosure is not limited thereto, and any other arrangement of the mover poles 2030 suitable for moving the carrier over an angle may be provided. For example, FIG. 21 shows a different arrangement of the mover poles 2030 which is likewise suitable for providing the reluctance-based angular force.

A stator may include a set of stator poles arranged to interact with the mover poles 2030, e.g. a set of stator poles disposed in a curved arrangement corresponding to the arrangement of the mover poles 2030 in FIG. 20.

Figure 21:
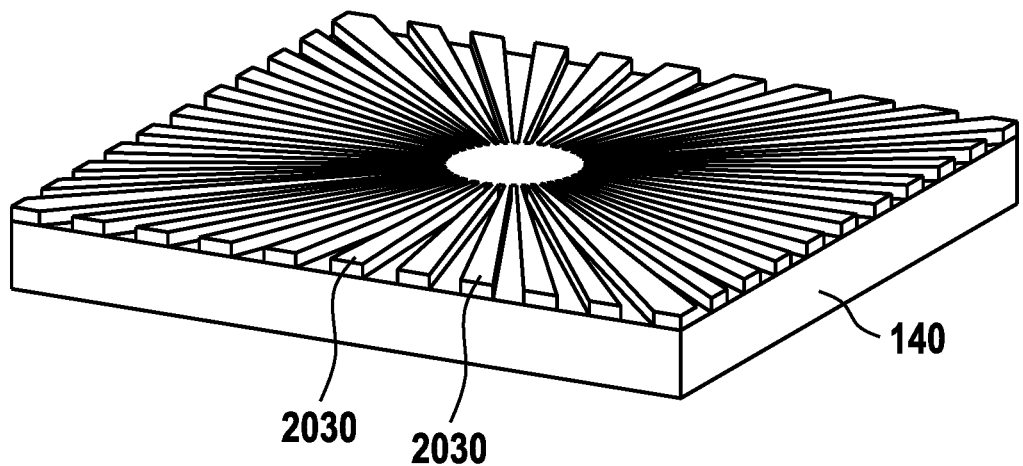

Due to the arrangement of the mover poles 2030, e.g. the curved arrangement shown in FIG. 20 or the alternative arrangement shown in FIG. 21, a reluctance-based angular force causing a movement of the carrier over an angle may be provided. The reluctance-based angular force is provided in a manner similar to the reluctance-based drive force as described herein. The system formed by the mover poles 2030 and corresponding stator poles of a stator strives to reach a state of reduced magnetic reluctance. Accordingly, a horizontal movement of the carrier is provided which, due to the particular arrangement of the mover poles 2030, causes an angular motion of the mover.

According to a further embodiment, a method for contactless transportation of a carrier is provided. The method includes controlling at least one electromagnet of a set of electromagnets of a linear reluctance motor. The linear reluctance motor includes one or more linear stators defining a transportation track for the carrier, the carrier being a substrate carrier or a mask carrier. The linear reluctance motor includes a mover connected to the carrier. The linear reluctance motor includes the set of electromagnets and a first magnetic material. The one or more linear stators include the set of electromagnets and the mover includes the first magnetic material, or the mover includes the set of electromagnets and the one or more linear stators include the first magnetic material. The at least one electromagnet is controlled to generate a magnetic field interacting with the first magnetic material to provide both a reluctance-based vertical force and a reluctance-based drive force acting on the mover. The method may be performed by the apparatus according to embodiments described herein. Every function or set of functions of the apparatus described herein, in any combination, can be included as part of the method.

The method may include individually controlling the reluctance-based vertical force and the reluctance-based drive force.

The set of electromagnets may include a first electromagnet. The method described herein may include controlling a first current in the first electromagnet to control a magnitude of the reluctance-based vertical force. The method may include controlling a second current in the first electromagnet to control a magnitude of the reluctance-based drive force.

The method described herein may include sensing a position of the carrier with respect to a transportation direction using one or more sensors as described herein. The method may include controlling the reluctance-based drive force in response to a signal provided by the one or more sensors to position the carrier in a target position with respect to the transportation direction.

The set of electromagnets may include one or more first electromagnets and one or more second electromagnets. The one or more first electromagnets may face the one or more second electromagnets with respect to a transversal direction. The method as described herein may include controlling the one or more first electromagnets and/or the one or more second electromagnets to provide a reluctance-based transversal force acting on the mover. The reluctance-based transversal force may be configured to position the carrier in a target position with respect to the transversal direction.

At least one of the one or more linear stators may include stator poles. The mover may include mover poles. At least one stator pole may include a pattern having a plurality of protrusions, a plurality of openings and/or a variation of magnetic properties, and the method may include performing a contactless fine-alignment of the carrier using the pattern. Additionally or alternatively, at least one mover pole may include a pattern having a plurality of protrusions, a plurality of openings and/or a variation of magnetic properties, and the method may include performing a contactless fine-alignment of the carrier using the pattern.

The method as described herein may include contactlessly transporting the carrier to a processing position using the linear reluctance motor. The method may include, in the processing position, processing a substrate supported by the carrier using a processing device.

Figure 22:
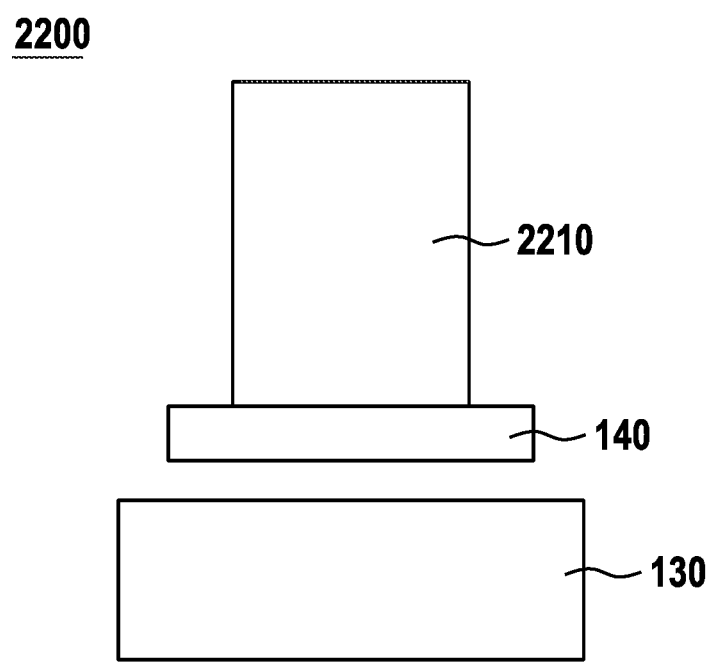
FIG. 22 shows an apparatus for contactless transportation of a deposition source.

According to a further embodiment, and as illustrated in FIG. 22, an apparatus 2200 for contactless transportation of a deposition source 2210 is provided. The apparatus 2200 includes the deposition source 2210. The apparatus 2200 includes a linear reluctance motor for providing both a contactless levitation and a contactless drive of the deposition source 2210. The linear reluctance motor includes one or more linear stators 130. The one or more linear stators 130 define a transportation track for the deposition source 2210. The linear reluctance motor includes a mover 140 connected to the deposition source 2210. The linear reluctance motor includes a set of electromagnets and a first magnetic material. The one or more linear stators 130 include the set of electromagnets and the mover 140 includes the first magnetic material, or the mover 140 includes the set of electromagnets and the one or more linear stators 130 include the first magnetic material. The apparatus 2200 includes a controller connected to the set of electromagnets.

The mover 140 is connected to the deposition source 2210. For example, the mover 140 may be mounted directly to the deposition source 2210, or may be mounted to a support carrying the deposition source 2210.

The deposition source 2210 may be an evaporation source. An evaporation source may be configured for evaporating a deposition material. An evaporation source may be configured for deposition of organic materials, e.g. for OLED display manufacturing on large area substrates. An evaporation source may have a linear shape. In operation, the evaporation source may extend in a vertical direction. For example, the length of the evaporation source can correspond to the height of the substrate. An evaporation source may include an evaporation crucible. The evaporation crucible may be configured to receive organic material, or another material, and to evaporate the material. The organic material may be evaporated using a heating unit included in the evaporation source. The evaporated material may be emitted towards the substrate.

Alternatively, the deposition source 2210 may be a sputter deposition source. A sputter deposition source may include one or more sputter cathodes, e.g. rotatable cathodes. The cathodes can be planar or cylindrical cathodes having a target material to be deposited on the substrate. A sputter deposition process can be a DC sputters source, and (middle frequency) MF sputters source or an RF frequency (RF: radio frequency) sputter deposition process. As an example, a RF sputter deposition process can be used when the material to be deposited on the substrate is a dielectric material. Frequencies used for RF sputter processes can be about 13.56 MHZ or higher. A sputter deposition process can be conducted as magnetron sputtering. The term "magnetron sputtering" refers to sputtering performed using a magnet assembly, e.g., a unit capable of generating a magnetic field. Such a magnet assembly can include or consist of a permanent magnet. The permanent magnet can be arranged within a rotatable target or coupled to a planar target in a manner such that free electrons are trapped within the generated magnetic field generated below a rotatable target surface. The magnet assembly can also be arranged coupled to a planar cathode.

The apparatus 2200 differs from the apparatus 100 as described herein in that the former apparatus is configured for transportation of a deposition source whereas the latter apparatus is configured for transportation of a substrate carrier or mask carrier. Apart from said difference, the apparatus 2200 functions fully analogously to the apparatus 100. The apparatus 2200 may include any feature or feature combination, and may perform any function or combination of functions, of the apparatus 100 for contactless transportation of a carrier as described herein, wherein said features or functions now relate to the transportation of the deposition source instead of the carrier.

In the apparatus 2200, magnetic overcompensation may be facilitated using additional permanent magnets as described in FIG. 14 to passively lift the arrangement in vertical direction, and to actively control the levitation height using the set of electromagnets.

According to a further embodiment, a method for contactless transportation of a deposition source is provided. The method includes controlling at least one electromagnet of a set of electromagnets of a linear reluctance motor. The linear reluctance motor includes one or more linear stators defining a transportation track for the deposition source. The linear reluctance motor includes a mover connected to the deposition source. The linear reluctance motor includes the set of electromagnets and a first magnetic material. The one or more linear stators include the set of electromagnets and the mover includes the first magnetic material, or the mover includes the set of electromagnets and the one or more linear stators include the first magnetic material. The at least one electromagnet is controlled to generate a magnetic field interacting with the first magnetic material to provide both a reluctance-based vertical force and a reluctance-based drive force acting on the mover.

Figure 23:
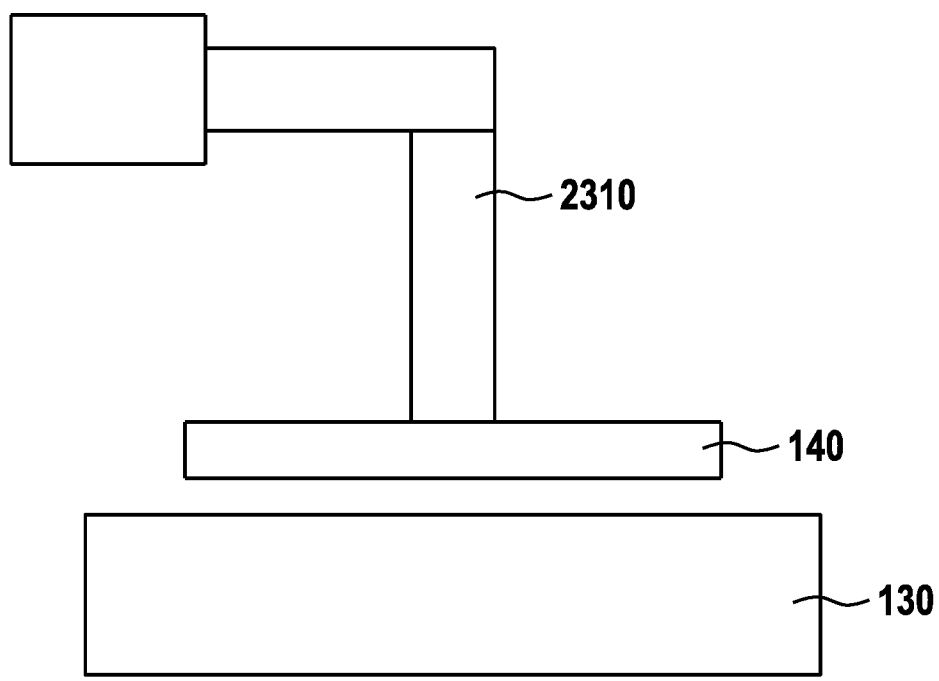
FIG. 23 shows an apparatus for contactless transportation of a robot arm.

According to a further embodiment, and as illustrated in FIG. 23, an apparatus 2300 for contactless transportation of a robot arm 2310 is provided. The apparatus 2300 includes the robot arm 2310. The apparatus 2300 includes a linear reluctance motor for providing both a contactless levitation and a contactless drive of the robot arm 2310. The linear reluctance motor includes one or more linear stators 130. The one or more linear stators 130 define a transportation track for the robot arm 2310. The linear reluctance motor includes a mover 140 connected to the robot arm 2310. The linear reluctance motor includes a set of electromagnets and a first magnetic material. The one or more linear stators 130 include the set of electromagnets and the mover 140 includes the first magnetic material, or the mover 140 includes the set of electromagnets and the one or more linear stators 130 include the first magnetic material. The apparatus 2300 includes a controller connected to the set of electromagnets.

The robot arm 2310 may include an arm portion and an end effector at an end of the arm portion. The end effector may be configured to pick-up, hold and move objects, such as substrates or other workpieces. The robot arm may have one or more joints for allowing a movement of the end effector.

The apparatus 2300 differs from the apparatus 100 as described herein in that the former apparatus is configured for transportation of a robot arm whereas the latter apparatus is configured for transportation of a substrate carrier or mask carrier. Apart from said difference, the apparatus 2300 functions fully analogously to the apparatus 100. The apparatus 2300 may include any feature or feature combination, and may perform any function or combination of functions, of the apparatus 100 for contactless transportation of a carrier as described herein, wherein said features or functions now relate to the transportation of the robot arm instead of the carrier.

According to a further embodiment, a method for contactless transportation of a robot arm is provided. The method includes controlling at least one electromagnet of a set of electromagnets of a linear reluctance motor. The linear reluctance motor includes one or more linear stators defining a transportation track for the robot arm. The linear reluctance motor includes a mover connected to the robot arm. The linear reluctance motor includes the set of electromagnets and a first magnetic material. The one or more linear stators include the set of electromagnets and the mover includes the first magnetic material, or the mover includes the set of electromagnets and the one or more linear stators include the first magnetic material. The at least one electromagnet is controlled to generate a magnetic field interacting with the first magnetic material to provide both a reluctance-based vertical force and a reluctance-based drive force acting on the mover.

While the foregoing is directed to some embodiments, other and further embodiments may be devised without departing from the basic scope thereof, and the scope thereof is determined by the claims that follow.

The invention claimed is:

1. A substrate carrier assembly, comprising:
   a carrier configured to support a substrate; and
   a first mover coupled to the carrier, the first mover comprising:
      a first set of poles extending in a first direction; and
   a second mover coupled to the carrier, the second mover comprising:
      a second set of poles extending in the first direction, wherein:
         each pole of the first set and the second set comprise a ferromagnetic material;
         the first set is spaced apart in a second direction from the second set; and
         the first direction and the second direction are at a first angle to each other.

2. The substrate carrier assembly of claim 1, wherein the first mover further comprises a first elongated bar that comprises the first set of poles, wherein the second mover further comprises a second elongated bar that comprises the second set of poles, and wherein the first elongated bar and the second elongated bar each comprise a single material.

3. The substrate carrier assembly of claim 2, wherein the first set of poles and the second set of poles are formed in a linear array that extends in the first direction.

4. The substrate carrier assembly of claim 3, wherein the first set of poles and the second set of poles extend in a third direction that is perpendicular to the first direction and the second direction.

5. The substrate carrier assembly of claim 1, further comprising:
   a third mover coupled to the carrier, the third mover comprising:
      a third set of poles extending in the second direction; and
   a fourth mover coupled to the carrier, the fourth mover comprising:
      a fourth set of poles extending in the second direction, wherein:
         each pole of the third set of poles and the fourth set of poles comprise a ferromagnetic material; and
         the third set of poles is spaced apart in the first direction from the fourth set of poles.

6. The substrate carrier assembly of claim 1, wherein the carrier comprises an opening for receiving the substrate.

7. The substrate carrier assembly of claim 6, wherein the opening extends in the second direction and a third direction, wherein the third direction is perpendicular to the first direction and the second direction.

8. The substrate carrier assembly of claim 6, further comprising one or more support portions coupled to the carrier and extending into the opening, the one or more support portions being configured to support the substrate.

9. The substrate carrier assembly of claim 1, wherein the first set of poles and the second set of poles each comprise a surface that comprises a plurality protrusions.

10. The substrate carrier assembly of claim 1, wherein the carrier further comprises a first edge and a second edge, the second edge being opposite to the first edge, the first set of poles are positioned adjacent to the first edge, and
   the second set of poles are positioned adjacent to the second edge.

11. The substrate carrier assembly of claim 1, wherein the carrier is configured to support a second substrate.

12. The substrate carrier assembly of claim 1, further comprising a first elongated bar that comprises the first set of poles and a second elongated bar that comprises the second set of poles, and the first elongated bar and the second elongated bar each comprise a silicon steel, a ferritic steel or a martensitic steel.

13. A substrate carrier assembly, comprising:
   a carrier configured to support a substrate; and
   a first elongated bar coupled to the carrier, comprising:
      a first set of poles extending in a first direction; and
   a second elongated bar coupled to the carrier, comprising:
      a second set of poles extending in a second direction, wherein:
         each pole of the first set and the second set comprise a ferromagnetic material; and
         the first direction and the second direction are at a first angle to each other.

14. The substrate carrier assembly of claim 13, wherein the first set of poles form a first linear arrangement in the first direction, and wherein the second set of poles form a second linear arrangement in the second direction.

15. The substrate carrier assembly of claim 13, wherein the carrier comprises an opening for receiving the substrate.

16. The substrate carrier assembly of claim 15, further comprising one or more support portions coupled to the carrier and extending into the opening, the one or more support portions being configured to support the substrate.

17. The substrate carrier assembly of claim 13, wherein the first elongated bar and the second elongated bar each comprise a silicon steel, a ferritic steel or a martensitic steel.

18. A substrate carrier assembly, comprising:
   a carrier configured to support a substrate; and
   a mover coupled to the carrier, the mover comprising:
      a first set of poles extending in a first direction;
      a second set of poles extending in a second direction; and
      a third set of poles extending in the first direction or the second direction, wherein:
         each pole of the first set, the second set, and the third set comprise ferromagnetic material; and
         the first direction and the second direction are at a first angle to each other.

19. The substrate carrier assembly of claim 13, wherein the carrier comprises an opening for receiving the substrate, and wherein the carrier substrate assembly further comprises:
   one or more support portions coupled to the carrier and extending into the opening, the one or more support portions being configured to support the substrate.

20. The substrate carrier assembly of claim 18, wherein the first set of poles are arranged to provide a reluctance-based angular force for moving the carrier in the first direction, and wherein the second set of poles are arranged to provide another reluctance-based angular force for moving the carrier in the second direction.

* * * * *